US010112153B2

(12) United States Patent
McCutcheon et al.

(10) Patent No.: US 10,112,153 B2
(45) Date of Patent: Oct. 30, 2018

(54) THIN FILM COMPOSITE MEMBRANE STRUCTURES

(71) Applicants: 3M Innovative Properties Company, St. Paul, MN (US); University of Connecticut, Farmington, CT (US)

(72) Inventors: Jeffrey R. McCutcheon, Farmington, CT (US); Thomas J. Hamlin, Saint Paul, MN (US); Mark T. Meyering, Saint Paul, MN (US); Liwei Huang, Farmington, CT (US)

(73) Assignees: 3M Innovative Properties Company, St. Paul, MN (US); University of Connecticut, Farmington, CT (US)

( * ) Notice: Subject to any disclaimer, the term of this patent is extended or adjusted under 35 U.S.C. 154(b) by 778 days.

(21) Appl. No.: 14/389,799

(22) PCT Filed: Mar. 15, 2013

(86) PCT No.: PCT/US2013/031946
§ 371 (c)(1),
(2) Date: Oct. 1, 2014

(87) PCT Pub. No.: WO2013/154755
PCT Pub. Date: Oct. 17, 2013

(65) Prior Publication Data
US 2015/0060364 A1 Mar. 5, 2015

Related U.S. Application Data

(60) Provisional application No. 61/621,750, filed on Apr. 9, 2012.

(51) Int. Cl.
*B01D 29/00* (2006.01)
*B01D 71/56* (2006.01)
(Continued)

(52) U.S. Cl.
CPC ......... *B01D 71/56* (2013.01); *B01D 67/0006* (2013.01); *B01D 69/12* (2013.01);
(Continued)

(58) Field of Classification Search
CPC ................ B01D 29/00; B01D 29/0002; B01D 29/0004; B01D 29/0093; B01D 29/01;
(Continued)

(56) References Cited

U.S. PATENT DOCUMENTS 3,926,798 A 12/1975 Cadotte
4,039,440 A 8/1977 Cadotte
(Continued)

FOREIGN PATENT DOCUMENTS

CN 1951549 A 4/2007
CN 101502763 8/2009
(Continued)

OTHER PUBLICATIONS

Liwei, et al., "Novel hydrophilic nylon 6,6 microfiltration membrane supported thin film composite membranes for engineered osmosis", *Journal of Membrane Science*, vol. 437, (Feb. 4, 2015) pp. 141-149, XP055230604.
(Continued)

*Primary Examiner* — Allison G Fitzsimmons
(74) *Attorney, Agent, or Firm* — Servilla Whitney LLC

(57) ABSTRACT

Provided are thin film composite membrane structures comprising: a selective membrane layer for ion rejection attached to a support layer, the support layer comprising a multi-zone microfiltration membrane comprising: a porous support material; and at least two microfiltration zones, where a first zone comprises a first membrane and a second zone that is attached to the first zone and that coats at least a portion of the porous support material. Thin film composite membrane structures may be provided in reverse osmosis
(Continued)

systems or nanofiltration systems. Also, thin film composite membrane structures may be provided in direct osmotic concentration systems, forward osmosis systems, or pressure retarded osmosis systems.

18 Claims, 14 Drawing Sheets

(51) Int. Cl.
  *B01D 69/12* (2006.01)
  *B01D 71/82* (2006.01)
  *B01D 67/00* (2006.01)
  *C02F 1/44* (2006.01)
  *B01D 39/00* (2006.01)

(52) U.S. Cl.
  CPC ........... *B01D 69/125* (2013.01); *B01D 71/82* (2013.01); *C02F 1/441* (2013.01); *C02F 1/442* (2013.01); *B01D 2323/40* (2013.01); *B01D 2323/42* (2013.01); *B01D 2325/02* (2013.01); *B01D 2325/04* (2013.01)

(58) Field of Classification Search
  CPC ........ B01D 39/00; B01D 39/14; B01D 39/16; B01D 39/1692; B01D 39/18; B01D 69/00; B01D 69/06; B01D 69/10; B01D 69/12; B01D 69/125; B01D 71/00; B01D 71/06
  USPC ....... 210/500.1, 500.21, 506, 507, 490, 483; 264/41, 49, 45.1
  See application file for complete search history.

(56) References Cited

U.S. PATENT DOCUMENTS

| | | | |
|---|---|---|---|
| 4,259,183 A | 3/1981 | Cadotte | |
| 4,277,344 A | 7/1981 | Cadotte | |
| 4,769,148 A | 9/1988 | Fibiger | |
| 5,472,607 A | 12/1995 | Mailvaganam | |
| 6,026,968 A * | 2/2000 | Hachisuka | B01D 67/0088 210/490 |
| 6,056,529 A | 5/2000 | Meyering | |
| 6,090,441 A * | 7/2000 | Vining, Jr. | B01D 69/10 210/490 |
| 6,264,044 B1 | 7/2001 | Meyering | |
| 6,280,791 B1 | 8/2001 | Meyering | |
| 6,513,666 B2 | 2/2003 | Meyering | |
| 6,736,971 B2 | 5/2004 | Sale | |
| 7,490,752 B2 | 2/2009 | Ehrstrom | |
| 7,785,471 B2 | 8/2010 | Sabottke | |
| 8,181,794 B2 | 5/2012 | McGinnis | |
| 2002/0117439 A1 | 8/2002 | Paul | |
| 2008/0149561 A1 | 6/2008 | Chu | |
| 2009/0071903 A1 | 3/2009 | Nakatsuji et al. | |
| 2011/0073540 A1 | 3/2011 | McGinnis | |

FOREIGN PATENT DOCUMENTS

| | | |
|---|---|---|
| EP | 2695670 A1 | 2/2014 |
| JP | S62180702 A | 8/1987 |
| JP | 2006130497 A | 5/2006 |
| JP | 2008253906 A | 10/2008 |
| JP | 2009262089 A | 11/2009 |
| JP | 2010099549 A | 5/2010 |
| WO | WO 2011/028541 | 3/2011 |
| WO | WO 2011/060202 | 5/2011 |
| WO | WO 2012/021044 | 2/2012 |

OTHER PUBLICATIONS

Liwei, et al., "Novel hydrophilic nylon 6,6 microfiltration membrane supported thin film composite membranes for engineered osmosis", *Journal of Membrane Science*, vol. 437, (Feb. 4, 2013) pp. 141-149, XP055230604.
Dow Liquid Separations FILMTEK™ Elements product literature, published Dec. 1997.
Dow Liquid FILMTEK™ NF270-400 Nanofiltration Element product literature, Form No. 609-00346-0911.
CSM RE4040-SH Reverse Osmosis Membrane element product literature (Jul. 30, 2008).
McCutcheon, J., et al., U of Conn. Invention Disclosure Form "Hydrophilic Microfiltration Membrane Supported Thin Film Composite Membrane" (Jun. 2012).
Huang, "Novel Hydrophilic Nylon 6,6 Microfiltration Membrane Supported Thin Film Composite Membranes for Engineered Osmosis" Center for Environmental Sciences & Engineering (Mar. 6, 2012).
"Influence of support layer of composite PDMS membranes on performance of hydrophobic pervaporation", Journal of Chemical Industry and Engineering (China), vol. 57, No. 1 (Jan. 2006), 5 pages.
"The Osmonics Filtration Spectrum", http://www.liquidfiltration-products.com/LiquidFiltration/Osmonicsfiltraspec.html, accessed May 14, 2018, 1 pg.

* cited by examiner

THIN FILM COMPOSITE MEMBRANE STRUCTURES

CROSS-REFERENCE TO RELATED APPLICATIONS

This application is the National Stage entry of PCT/US13/31946, filed on Mar. 15, 2013 which claims priority to U.S. Prov. Appln. No. 61/621,750, filed on Apr. 9, 2012, the disclosure of which are incorporated herein by reference in their entireties.

FEDERALLY SPONSORED RESEARCH AND DEVELOPMENT

This invention was made with government support under CBET #1067564 awarded by the National Science Foundation. The government has certain rights in the invention.

FIELD

The present invention relates to the field of separation of by ion rejecting membranes using composite structures having a thin film ion rejecting layer and a support. The support can specifically be a membrane having multiple separation zones.

BACKGROUND

Fresh water supplies are under threat globally. Reverse osmosis, nanofiltration, and engineered osmosis (i.e. direct osmotic concentration and forward osmosis) technologies will aid in lowering the cost of water purification. In addition, pressure retarded osmosis, which is also an engineered osmosis technology, will be used to generate electricity. Desalination, brackish water treatment, scale control, and wastewater recovery are all applications of such technologies, growing in the 8%-15% per year range. Such technologies have different opportunities than traditional reverse osmosis and nanofiltration systems for developing efficiencies and cost-savings. With reverse osmosis, separation is driven by hydraulic pressure. This high pressure leads to high costs of operation because of large energy demands. With engineered osmosis technologies, separation is driven by osmotic pressure/concentration gradients. These flows occur spontaneously by osmosis.

Thin film composite (TFC) membranes have been in use for nanofiltration and reverse osmosis for many years. Such membranes are a composite of a selective, e.g., ion rejecting, membrane layer and a support layer. The development of these membranes has generally focused on the optimization of the selective membrane layer, which is thin, fragile, and highly permselective. Optimization of such membranes includes improving characteristics such as permeate production rates with lower energy input and imparting fouling resistance (see. U.S. Pat. No. 7,490,725 entitled "Reverse Osmosis Membrane and Process" to Pinnau).

Currently-used technologies can be inefficient and costly. Improvement of flux while maintaining ion rejection capacity is one way to develop efficiencies. Reducing the cost of manufacture of devices is a way to realize cost-savings.

There is a need to improve the support layers as a way to improve overall TFC membrane performance in the field of separation by ion rejecting membranes. This is particularly true when using membranes in nontraditional modes such as direct osmotic concentration (DOC), forward osmosis (FO), or pressure retarded osmosis (PRO).

SUMMARY

Provided are thin film composite (TFC) membrane structures having a thin film selective or active membrane layer for ion rejection located on a hydrophilic and/or highly engineered support layer. TFC membrane structures can use cast hydrophilic microfiltration membranes, such as nylon 6,6 based membranes, as a porous support. The structures comprise a thin, selective, and highly permeable layer made out of a desirable polymer such as a polyamide, which is mechanically supported by the porous support layer. Such TFC membrane structures are applicable to reverse osmosis, nanofiltration, forward osmosis, pressure retarded osmosis and direct osmotic concentration applications.

In a first aspect, provided are thin film composite membrane structures comprising: a selective membrane layer for ion rejection attached to a support layer, the support layer comprising a multi-zone microfiltration membrane comprising: a porous support material; and at least two microfiltration zones, where a first zone comprises a first membrane and a second zone that is attached to the first zone and that coats at least a portion of the porous support material.

In an embodiment, the selective membrane layer comprises a polyamide membrane formed by interfacial polymerization on the hydrophilic support layer. A detailed embodiment provides that the polyamide comprises piperazine (PIP), m-phenylenediamine (MPD), or combinations thereof.

One or more embodiments provide that the first zone comprises a pore size that is smaller than a pore size of the second zone. In a detailed embodiment, the pore size of the second zone is greater than the pore size of the first zone by a factor in the range of 1.1 to 500 (or 1.2 to 300, or 1.5 to 100, or 2 to 50).

In one embodiment, the first zone comprises a pore size in the range of 0.02 microns to 0.45 microns. In an embodiment, the first zone comprises a thickness of at least 2.0 microns, or even a thickness in the range of 2.0 microns to 10 microns (or 2.5 to 8, or 3 to 7).

In one embodiment, the second zone comprises a pore size in the range of 0.65 microns to 10.0 microns.

In one or more embodiments, the first zone comprises a pore size in the range of 0.02 microns to 0.45 microns and the second zone comprises a pore size in the range of 0.65 microns to 10.0 microns.

Other embodiments provide that the second zone is continuously joined to the first zone through molecular entanglement.

Further embodiments provide that the first zone of the multi-zone microfiltration support layer is attached to the selective membrane layer.

In a detailed embodiment, the support layer comprises a polyamide, such as nylon 6,6. In other embodiments, the support layer comprises a modified membrane formed from a polyethersulfone, a polysulfone, a polyvinylidene difluoride (PVDF), ethylene chlorotrifluoroethylene (ECTFE), and/or polypropylene.

In one embodiment, the porous support layer comprises a scrim, a spacer element, or a combination thereof.

Another aspect provides thin film composite membrane structures comprising: a selective membrane layer for ion rejection, the selective membrane layer comprising a polyamide; and a multi-zone microfiltration support layer attached to the selective membrane, the multi-zone microfiltration support layer comprising: a porous support material comprising a nonwoven, woven, or extruded material selected from the group consisting of polypropylene, polyester, polyethylene, and combinations thereof; and at least two microfiltration zones each comprising a polyamide, where a first zone comprises a first membrane and a second zone that is attached to the first zone and that coats at least a portion of the porous support material.

In one embodiment, the polyamide of the selective membrane layer comprises piperazine (PIP), m-phenylenediamine (MPD), or combinations thereof.

In another embodiment, the polyamide of the at least two microfiltration zones comprises 6,6 nylon.

In a detailed embodiment, the first zone comprises a pore size in the range of 0.02 microns to 0.45 microns and a thickness in the range of 2.0 microns to 10 microns, and the second zone comprises a pore size in the range of 0.65 microns to 10.0 microns.

Another aspect provides methods of making a thin film composite membrane structure, the method comprising: forming a multi-zone microfiltration membrane; and forming a selective membrane on the multi-zone microfiltration membrane to form the thin film composite membrane structure. The selective membrane may be formed on the multi-zone microfiltration membrane by interfacial polymerization.

A further aspect provides methods of treating a liquid stream containing ions, the method comprising: providing any thin film composite membrane structure disclosed herein; and contacting the liquid stream with the thin film composite membrane structure. In one embodiment, the thin film composite membrane structure is provided in a reverse osmosis system or a nanofiltration system. In another embodiment, the thin film composite membrane structure is provided in a direct osmotic concentration system, a forward osmosis system, or a pressure retarded osmosis system.

DETAILED DESCRIPTION

Figure 1:
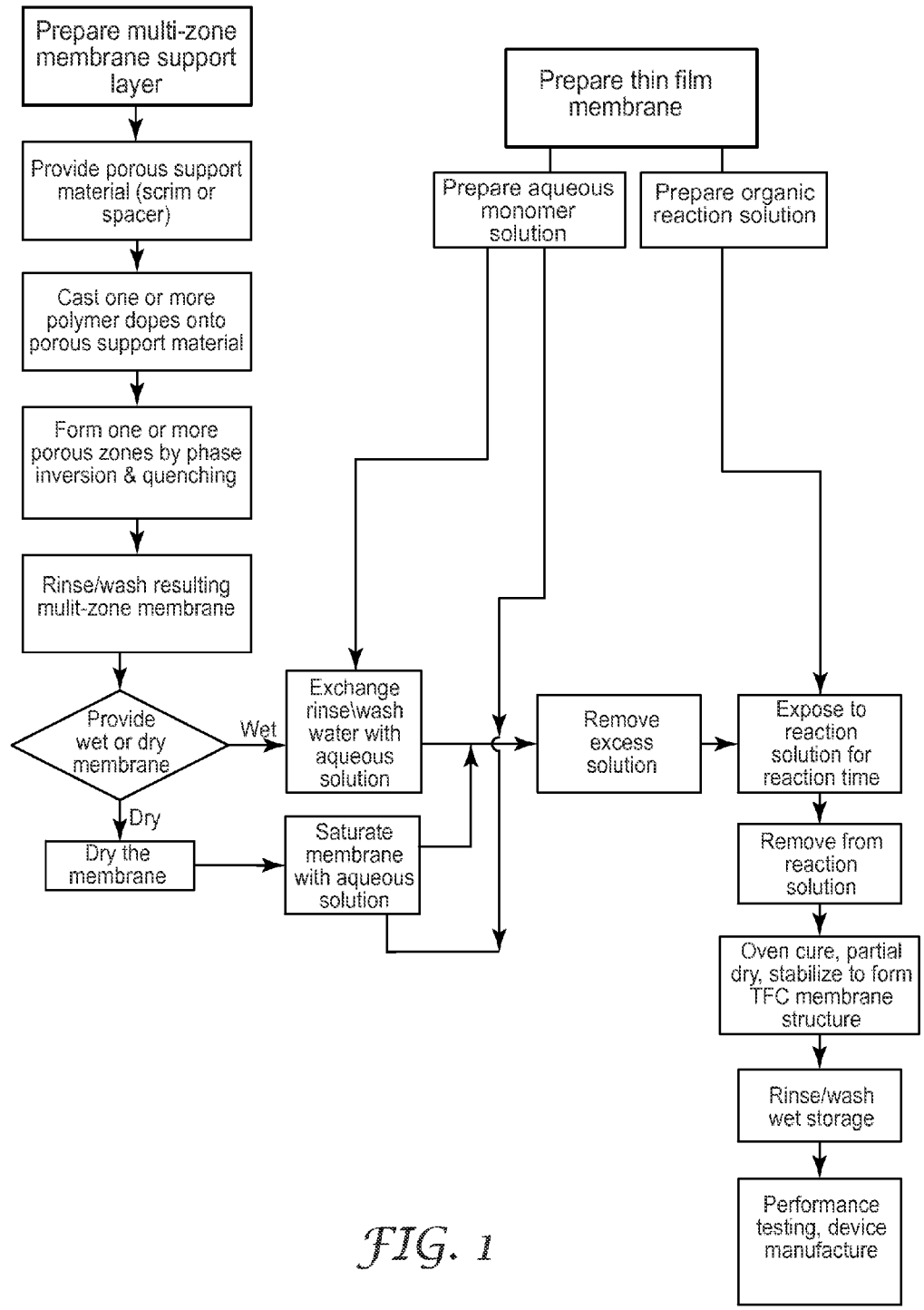
FIG. 1 is a flow diagram of an exemplary process for manufacturing the thin film composite (TFC) membrane structures disclosed herein.

Provided are thin film composite (TFC) membrane structures having a selective membrane layer for ion rejection located on a hydrophilic and/or highly engineered support layer.

Previously known TFC membranes have a highly anisotropic structure which provides both high permeability and selectivity in pressure-driven membrane separations like reverse osmosis (RO) and nanofiltration. This asymmetric structure, however, is detrimental to engineered osmosis applications, including direct osmotic concentration, forward osmosis and pressure retarded osmosis, due to the presence of internal concentration polarization (ICP). The support layers of previously known membranes are also hydrophobic. This intrinsic hydrophobicity prevents wetting of the support layers and results in reduced mass transport and enhanced internal concentration polarization.

For example, the use of polysulfone (PSu) phase-inversion casting film and polyester (PET) nonwoven, which are intrinsically hydrophobic, as support layers can inhibit efficiencies and effectiveness of selective membrane layers. It has been discovered herein that the use of a hydrophilic support layer facilitates wetting of that layer and improves overall functionality of the selective membrane layer. Suitable hydrophilic support layers are formed from hydrophilic polymers and/or polymers that are intrinsically hydrophobic but structures made from them have been otherwise treated to be hydrophilic. In addition, highly engineered microfiltration membranes have not previously been used to support selective membrane layers, and the use of a multi-zone microfiltration membrane improves overall functionality of the selective membrane layer. Specific multi-zoned microporous membranes, such as nylon membranes, have been developed as supports to cast selective membranes thereon. In addition, simple and cost effective processes have been developed to manufacture TFC composite membrane structures that exhibit very good performance characteristics.

Membranes with engineered geometry, such as multi-zone nylon 6,6 membranes, are used as a support structure for casting of a thin film nanofiltration or engineered (direct osmotic concentration, forward, and pressure retarded) osmosis membrane layer. These new thin film composite (TFC) membrane structures are more cost effective to produce than previous TFC membranes and demonstrate high mass and diffusional flow rates with good rejection characteristics. The multi-zone support structures enable the construction of thin film composite membrane structures that exhibit superior fluid management in the support layer by reducing pressure drop and providing for better mass transfer and diffusion characteristics at the interface with the thin film semi-porous layer.

Reference to "thin film composite (TFC) membrane structures" means separation devices that are formed from more than one structure. The TFC membrane structures have a thin film selective membrane suitable for ion separations while at the same time have a minimal thickness to deliver desired mass and diffusional flow rates and a support layer to provide sufficient mechanical and chemical strength withstand the demands of the devices where they are installed. For example, such devices exert/receive hydraulic loads, high differential pressures, pulsations and are exposed to cleaning chemicals.

Exemplary selective or active membrane layers are thin films and exhibit high permeability. Exemplary thin film selective membrane layers are found in U.S. Pat. No. 7,490,725. Thin film selective membranes are highly permeable, which means water passes through the membranes without impediment, e.g., at a flux that is acceptable for the application, while maintaining ion rejection efficiency. Suitable selective membranes can be fabricated as desired. Exemplary materials include polyamides such as piperazine (PIP)-based polyamides and m-phenylenediamine (MPD)-based polyamides.

Reference to "highly engineered microfiltration membranes" means creation of more than one functional zone in a composite article that provides microfiltration functionality. Zones may include one or more of a qualifying layer, a porous support material (e.g., scrim or spacer), and a membrane for providing mechanical support to a thin layer membrane. Suitable microfiltration membranes may be based on nylon membranes. Other polymer membranes may include those that are reinforced and/or unreinforced (for example those in commonly-owned U.S. Pat. No. 6,736,971, incorporated herein by reference, entitled "Pre-Metered, Unsupported Multilayer Microporous Membrane" (Sale)). Exemplary multi-zoned membranes and methods of making such membranes are in U.S. Pat. No. 6,090,441 entitled "Process of Making Reinforced Three Zone Microporous Membrane" (Vining), U.S. Pat. No. 6,513,666 entitled "Reinforced, Three Zone Microporous Membrane" (Meyering), and U.S. Pat. No. 6,056,529 (Meyering) the disclosures of which are herein incorporated by reference.

Reference to "modified" with respect to a membrane means that the membrane is rendered hydrophilic, which is needed when a polymer that is intrinsically hydrophobic is used to form a membrane. The membrane is treated in some manner to render it hydrophilic. To render a membrane hydrophilic, modifications include, but are not limited to, including a co-polymer in the dope used to prepare the membrane, post-treating the membrane with a coating, and oxidizing the membrane. Other polymer microfiltration support layers may comprise modified membranes formed from inherently hydrophobic polymers selected from: polyethersulfone, polysulfone, polyvinylidene difluoride (PVDF), ethylene chlorotrifluoroethylene (ECTFE), and polypropylene.

The scrim or spacer can be chosen from a wide range of nonwoven, woven, or extruded materials and is typically made from polypropylene, polyester, polyethylene, or bi-component variants of these materials. Other porous polymer materials can be utilized in a variety of formats.

Use of the term "microporous membrane" herein is intended to encompass microporous membranes having the ability to retain particles in the size range of from about 0.01 or smaller to about 10.0 microns and higher.

The term "continuous" as applied to microporous membranes are understood to refer to a microporous membrane wherein a continuum exists between the three zones constituting the membrane and that no break exists between the polymer structure which comprises a porous support zone and at least one other zone. The microporous membrane structure is continuous structure even in the presence of the reinforcing scrim, in that the fiber strains of scrim constitute a network between which the microporous membrane structure is continuous and penetrating. Therefore the scrim and the microporous membrane form continuous interpenetrating networks of their respective polymeric structures.

The term "pore size" refers to mean "Mean Flow Pore" as determined by the appropriate ASTM-F316-70 and/or ASTMF316-70 (Reapproved 1976) tests.

Turning to the figures, FIG. 1 provides a flow diagram of an exemplary process for manufacturing the thin film composite (TFC) membrane structures disclosed herein. It is estimated that such a process may be up to 50% lower in cost than commercially available reverse osmosis and nanofiltration membranes. By using an integrated process ("wet" process) where aqueous phase components for the thin film membrane are added to directly to the multi-zone support layer while it is wet, complexity of the processing steps is reduced and efficiencies in materials, time, and labor are realized. In FIG. 1, processes to form both a multi-zone membrane as the highly engineered support layer and a thin film membrane are provided to result in a TFC membrane structure. To form the multi-zone support layer, the first step is to provide a porous support material, which may be a scrim or a module spacer material. One or more dopes for a desired polymer(s), such as nylon 6,6, is then cast onto the porous support material using an apparatus such as one disclosed in U.S. Pat. No. 6,090,441, which is incorporated herein by reference. Polymer film(s) are then formed by phase inversion and quenching, which is then rinsed and washed to form the multi-zone membrane. At this point, the multi-zone can be further dried (according to the "dry" process) or it can stay in a wet state. The next step is to saturate the multi-zone membrane with an aqueous solution of monomers for the thin film membrane and subsequently remove the excess solution. Then, an organic reaction solution is added for a time sufficient to polymerize the thin film membrane. After the reaction is complete, the structure is removed from the reaction solution and cured in an oven, partially dried and stabilized. Then, the structure is rinsed and washed to form the final TFC membrane structure, which is then put into wet storage. Performance testing and module/device manufacture then follow as needed.

Support Layers

Figure 2:
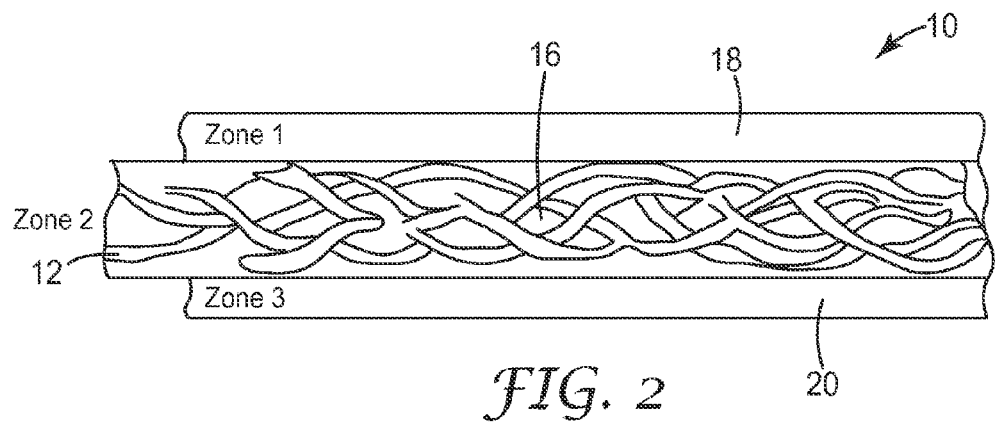
FIG. 2 is a schematic drawing of an exemplary three-zone support layer.
Figure 3:
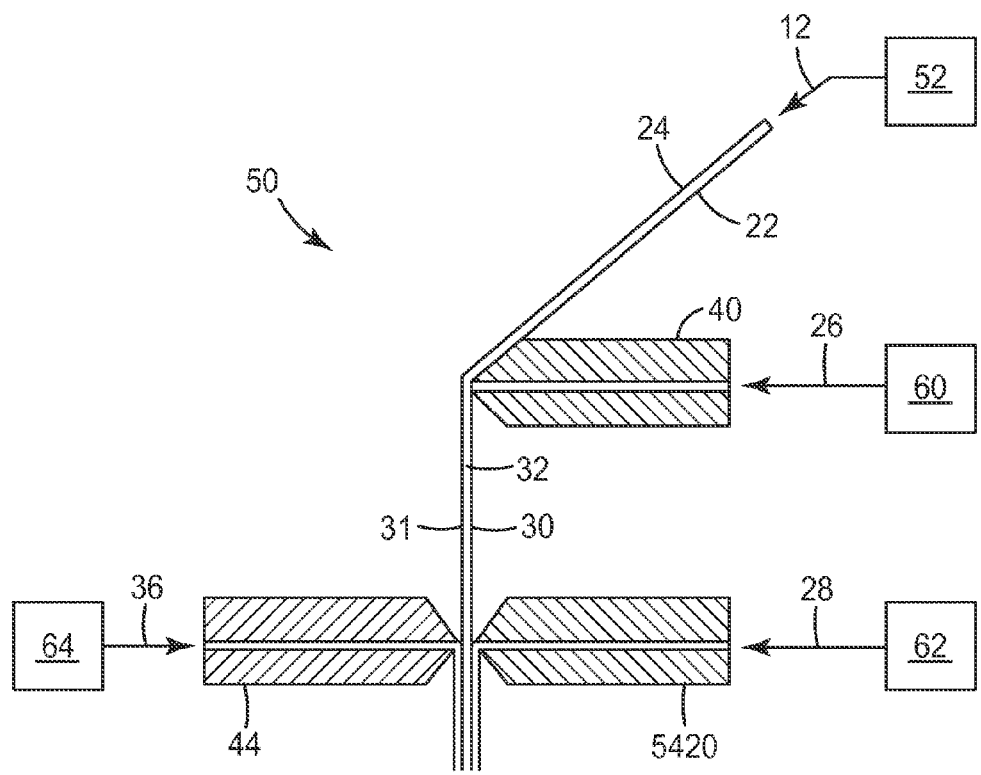
FIG. 3 is schematic representation of die positioning for multi-zone casting for forming the support layer of FIG. 2.

FIG. 2 illustrates one representative, three-zone, continuous, microporous membrane 10 suitable as a support layer, comprising a porous support material or scrim 12 at least substantially encapsulated in a porous support zone 16 ("zone 2"), the support zone being disposed between an upper zone 18 ("zone 1") and a third zone 20 ("zone 3") wherein the support material 12 is at least substantially embedded within the porous support zone 16. Zone 1 is a large pore membrane (e.g., 0.45 micron), zone 2 is also referred to as a precoat layer, and zone 3 is a qualifying layer having a thickness of 0.2 microns and a less open pore zone than either of zones 1 or 2. In FIG. 3, a schematic representation of die positioning for multi-zone casting, as disclosed in U.S. Pat. No. 6,090,441. In an assembly 52, a continuous supply of scrim or other support structure 12 receives polymer dopes 26, 28, 36. The scrim 12 is fed downwardly between a series of dies the first die 40 for pressure impregnating the scrim with a first dope 26 to a desired penetration and second 42 and third 44 dies for coating a second 28 and a third 36 dope on to the outer surfaces of the dope impregnated scrim. In an exemplary embodiment, the first die 40 is a single slot die, operatively connected to a suitable reservoir 60 containing the first dope 26. The first dope may vary depending on the type of film-forming polymer used, but is generally a liquid dope formulated and treated to produce a specific pore size when quenched. A conventional controlled pumping mechanism (not shown) operates to selectively deliver the first dope 26 from the reservoir 60 to the first die 40. The first die 40 has an opening configured to provide an even amount of the first dope 26 so as to pressure impregnate the scrim 12 to a desired depth as the scrim 12 passes by the opening of the first die 40. When different sizes of scrim 12 are used, the die 40 may be changed for appropriate scrim impregnation. After the scrim 12 is impregnated to a desired depth, the scrim travels between the second 40 and third 44 dies. In one embodiment of the apparatus, the scrim 12 is disposed vertically and travels in the downward direction. The scrim 12 may initially travel at an angle less than vertical, as shown in FIG. 3. Second 40 and third 44 dies are essentially disposed on opposite sides of the scrim 12. Second die 42 is directed to coat the polymer dope 28 desired onto the first surface 22 of the substantially saturated scrim 12 and in like manner, third die 44 is directed to coat the polymer dope 36 desired onto the second surface 24 of the scrim 12. Each die 42, 44, is fed from a reservoirs 62, 64 having the dopes 28, 36, respectively. The dopes comprise, for example, nylon 6,6 dissolved in formic acid where the desired polymer membranes are nylon and identical. It is to be appreciated that the dopes may be a combination of any of the well-known film-forming polymers in an appropriate well-known solvent. Conventionally controlled pumping mechanisms (not shown) selectively deliver the dope 28, 36 to the dies 42, 44. The microporous membrane structure so formed having three distinct layers of dope operatively applied to scrim is directly immersed in a quench bath followed by rinsing/washing (not shown).

Figure 4:
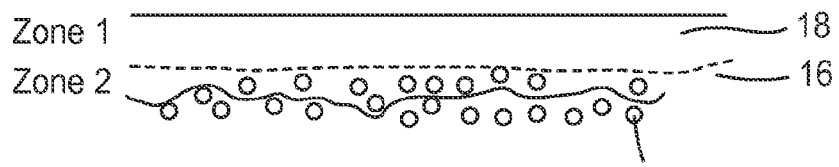
FIG. 4 is a schematic drawing of an exemplary two-zone support layer.

FIG. 4 provides a schematic drawing of an exemplary support layer made with two zones, where, in contrast to FIG. 3, upper zone 18 ("zone 1") has the smaller pore size, and porous support zone 16 ("zone 2") is manipulated in total thickness and penetration of the scrim, using a large pore size dope. Zone 1 is a thin film support zone to receive a thin film selective membrane. The support layer of FIG. 4 can be made according to the process of FIG. 1. Unlike the embodiment of FIG. 2, there is no separate third zone in FIG. 4, rather zone 2 includes scrim coated with polymer. The larger pore size polymer in zone 2 maintains maximum flux through the scrim material. The recommended range of pore size for zone 2 is in the region of 0.65 micron up to 5 or 10 microns and is generally a multiple of the pore size in zone 1. The thickness of zone 2 is controlled during coating to completely or partially fill the scrim material in such a manner as to provide an overcoat to the scrim which allows subsequent coating of the zone 1 dope without direct contact with the scrim. This insures that zone 1 does not intrude into the scrim layer which could impede both mass and diffusional flow characteristics of the support. The small pore structure (zone 1) is coated over the large pore structure (zone 2) and is thinner than commercial monolithic qualifying zones. The thickness of zone 2 may be anywhere from approximately 2 microns up to 50 microns depending on the type of scrim chosen. The thickness of zone 1 is typically less than 50 microns and can be as thin as the limit of contiguous coating, which is generally in the range of 2 to 10 microns. It is not necessary to maintain a thickness in zone 1 for particle retentive purposes, since the organic phase of the thin film selective membrane will be subsequently created on this surface only (in the "wet" process). The pore size of zone 1 is typically in the range of 0.02 micron up to 0.45 micron, or even in the range of 0.05 micron to 0.20 micron. The purpose of zone 1 is to provide adequate mechanical support for the thin film layer which will be coated on top of zone 1, while maintaining low pressure drop and good mass flow and diffusive pathways in the membrane. TFC membrane structures designed for the reverse osmosis and nanofiltration applications should be designed to be able to withstand the hydraulic differential pressures required for effective operation.

Figure 5:
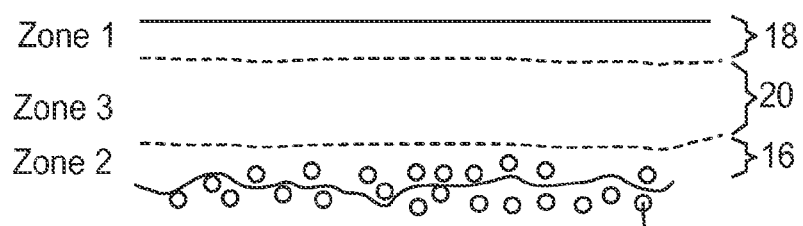
FIG. 5 is a schematic drawing of another exemplary three-zone support layer.
Figure 6:
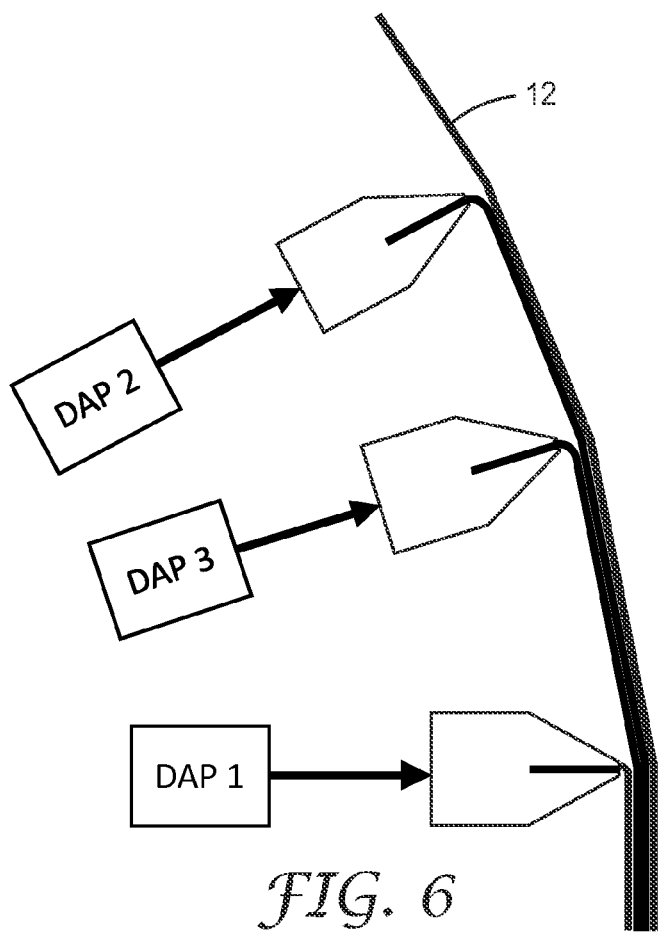
FIG. 6 is a schematic drawing of die positioning for the support layer of FIG. 5.

FIG. 5 is a schematic drawing of another exemplary three-zone support layer, where upper zone 18 (zone 1) provides the same functionality as upper zone 18 (zone 1) of FIG. 4, that is, it is the thin film support zone. Zone 2 is contains the scrim fill zone and is similar in function and structure of zone 2 of FIG. 4. For FIG. 5, a third zone 20 is applied in a manner illustrated in the diagram of the slot die set-up provided in FIG. 6, where the scrim layer 12 is provided, to which a dope (DAP2) is provided to form zone 2/porous support zone 16, to which a dope (DAP 3) is added to form third zone 20, to which a dope (DAP 1) is added to form zone 1/upper zone 18 (DAP 1). Reference to "DAP" means a "Dial-A-Pore™" unit used for thermal manipulation as discussed in U.S. Pat. No. 6,056,529. Zone 1 is also an open pore size zone that insures an adequate buffer zone between the scrim fill layer (zone 2) and the thin film support layer (zone 1). Third zone 20 (zone 3) is typically close in pore size to the zone 2 pore size.

Figure 7:
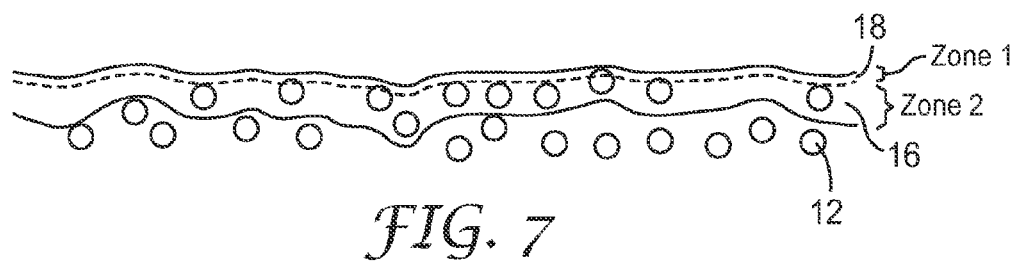
FIG. 7 is a schematic drawing of another exemplary two-zone support layer.

FIG. 7 is a schematic drawing of another exemplary two-zone support layer, which is a variation of FIG. 4. The thin film support zone is zone 1. There is no third zone. In FIG. 4, the casting of zone 2 is represented as providing a nominal buffer zone of a small finite thickness between the thin film support zone (zone 1) and the scrim. In FIG. 5, the thin film support zone (zone 1) is separated from the scrim by a substantial and controlled thickness buffer zone. In FIG. 7, the buffer zone is driven to a minimum. By manipulation of process parameters, it is possible to simultaneously vary both the depth of zone 2 penetration into the scrim and the thickness of the buffer zone between zone 1 and the reinforcement scrim. In particular, the buffer zone can be minimized. This will provide the thinnest overall support structure and highest packing density for device manufacturing, where both mass flow and diffusional flow are optimized. Manipulations include but are not limited to: viscosity of the dopes 1 and 2, total volume delivery per unit area, adjustments to the web tensions, die gaps, and web approach angles to the dies.

A function of zone 2 is to provide a mechanical anchor to the scrim, by means of the formation of the large pore size membrane in and around the physical features of the scrim. Zone 1 is attached to zone 2 by molecular entanglement of, for example, nylon polymer at the (zone 1 to zone 2) interface. The thickness of zone 1 is typically less than 50 microns and can be as thin as the limit of contiguous coating which is generally in the range of 2 to 10 microns. In FIG. 7, the majority of this (zone 1 to zone 2) interface is positioned above the top surface plane of the scrim. By the above-mentioned manipulations, it is possible to precisely control the location of this interface, to achieve the best balance between overall thickness and overall performance. A minority of features of the scrim will protrude into zone 1, with no substantial effect on overall performance.

Figure 8:
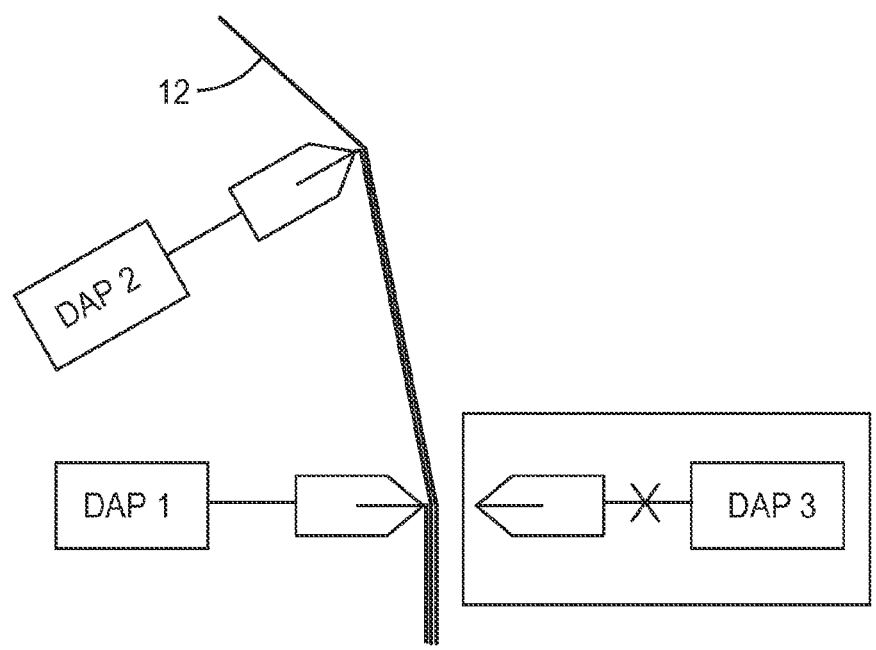
FIG. 8 is a schematic drawing of die positioning for the support layer of FIG. 7.

Few casting scrims (whether the scrim is a random laid fibrous material or a highly structured engineered material) will present a perfect or smooth casting surface, onto which a zone of well controlled thickness may be metered by common knife-style casting means. It is a benefit of a slot die casting system to meter out a contiguous coating of uniform thickness onto a surface that is not smooth. In this manner, the thinnest possible contiguous zone 1 layer can be realized on the widest variety of casting scrim surfaces. Even with the addition of the thin film nanofiltration or engineered osmosis layer(s) on top of zone 1, the thinnest overall structures may be achieved by this method. FIG. 8 provides a diagram of the slot die set-up for the embodiment of FIG. 7, where the scrim layer 12 is provided, to which a dope (DAP2) is provided to form zone 2/porous support zone 16, to which a to which a dope (DAP1) is added to form zone 1/upper zone 18 (DAP1). In FIG. 8, DAP3 is not used.

Suitable casting scrims are usually a very thin and uniform web made of very small fibers, to present a somewhat smooth surface onto which the casting polymer is metered out. A spacer element used in spiral wrapped tangential flow cartridges is typically a much thicker web, often a woven web made from relatively thick fibers (example is a Tricot web), or a engineered mesh with large apertures. The surfaces of a spacer element are not smooth, which is meant historically they are not used to receive the casting of a microfiltration, NR, or even RO membrane, where methods such as gravure, knife-over-roll, gap based methods work best with smooth surfaces. Spacer elements are more expensive than scrims. Also, if filling a spacer element with polymer dope in order to attach to the spacer element into a cartridge and bridge all the large spaces between the thick fibers, the polymer dope coating from a gap-based casting would have to be very thick, which increases costs and resulting flux.

Using slot die technology, which is depicted in FIGS. 3, 6, 8, 10 and U.S. Pat. No. 6,090,441, it would be possible to utilize a spacer element to receive the casting of a membrane because such technology does not require a smooth surface; provides easy control of the depth of penetration of the cast layer, and produces the thinnest zones possible for support of the ion-rejecting membrane. As needed, thicknesses of zones 1 and 2 can be adjusted to account for the use of the spacer element in the porous support layer.

Devices such as spiral wrapped tangential flow cartridges, or high density pleated structures for normal flow cartridges will benefit from a thinner overall structure; giving maximum flexibility in choices of flow distribution elements and drainage/spacer elements in the device. It is possible to cast directly onto the spacer element or incorporate the functionality of a spacer element directly into the abovementioned scrim/porous support zone, allowing further simplification, part reduction and cost reduction in the resulting devices.

Figure 9:
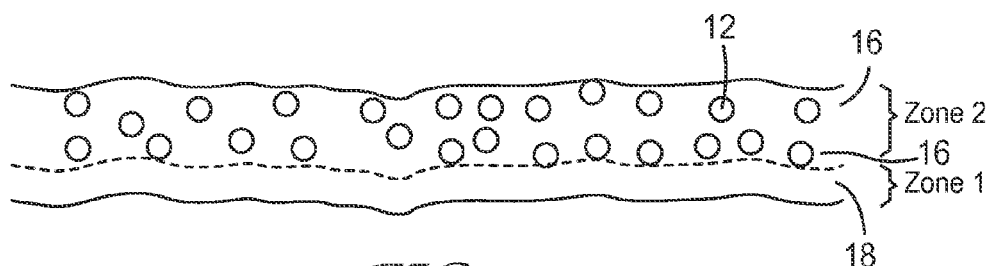
FIG. 9 is a schematic drawing of another exemplary two-zone support layer.
Figure 10:
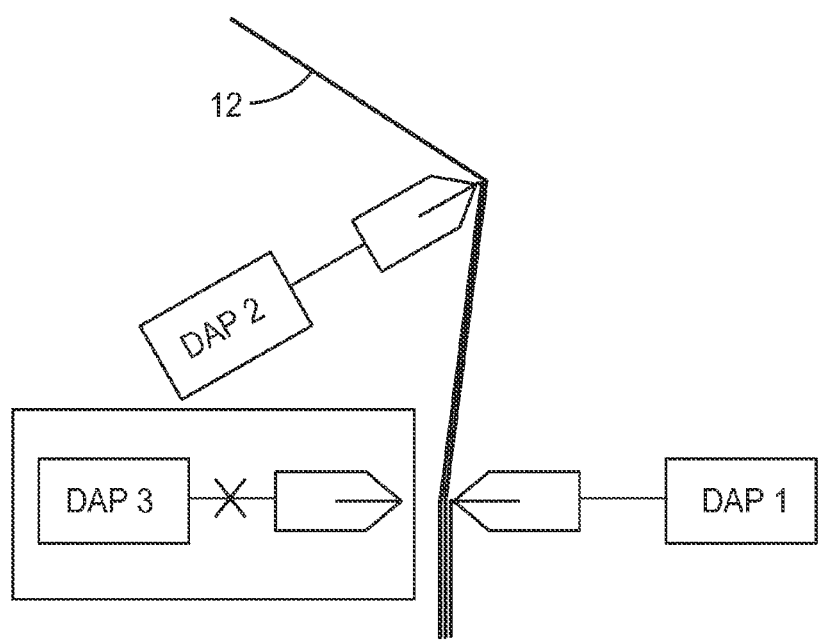
FIG. 10 is a schematic drawing of die positioning for the support layer of FIG. 9.

In FIG. 9, the thin film support zone is represented as zone 1. There is no zone 3. The casting of zone 2 is performed in a manner that both completely fills the scrim and provides a minimal layer of excess casting. This minimal layer provides a minimal buffer zone on the side opposite the porous support zone 16. In FIG. 9, the majority of the (zone 2 to zone 1) interface between the thin film support zone and the support zone is placed just below the bottom surface plane of the scrim. A minority of features of the scrim will protrude into zone 1, with no substantial effect or overall performance. The zone 1 layer is a contiguous coating of uniform thickness onto a surface that is not smooth. The thickness of zone 1 is typically less than 50 microns and can be as thin as the limit of contiguous coating which is generally in the range of 2 to 10 microns. FIG. 10 provides a diagram of the slot die set-up for the embodiment of FIG. 9, where the scrim layer 12 is provided, to which a dope (DAP2) is provided to form zone 2/porous zone 20, to which a to which a dope (DAP1) is added to form zone 1/upper zone 18 (DAP1). In FIG. 10, DAP3 is not used.

Thin Film Composite Membrane Structures

Figure 19:
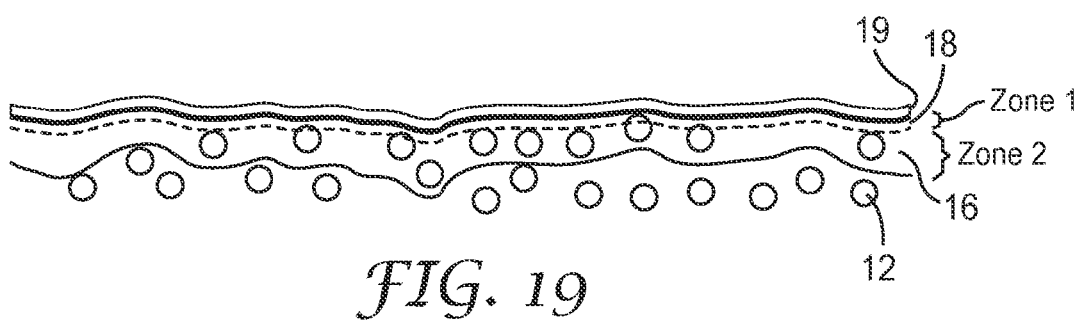
FIG. 19 is a schematic drawing of an exemplary thin film composite (TFC) membrane structure.

Thin film composites membrane structures can be formed by using the support layers disclosed herein and attaching a suitable thin film selective membrane layer. In FIG. 19, a schematic drawing of an exemplary thin film composite membrane structure is provided. The a selective membrane layer for ion rejection (also referred to as a thin film membrane) 19 is supported by zone 1 item 18, which is in turn supported by zone 2 item 16.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

In order to mitigate the problems with hydrophobicity of the prior art thin film supports, hydrophilic microfiltration membranes according to FIG. 2 were used as the thin film support to substitute for conventional polysulfone or polyethersulfone support. One such membrane is provided by 3M and referred to as BLA010, being made from nylon 6,6 and having a multi-zoned structure: three regions: 1) a large pore region at the upstream side of the membrane that usually faces the feed in microfiltration (MF) as a pre-filter by capturing larger particles; 2) a nonwoven scrim used as a mechanical support and to easy manufacturing; and 3) a small-pore region on the downstream side of the membrane that faces the permeate in MF to provide the retention of small contaminants. The mean pore sizes of the small-pore region and large-pore region are 0.1 µm and 0.45 µm, respectively. Compared to the polysulfone support for commercial membranes, BLA010 microfiltration membrane has a much rougher and more open porous surface, which may result in higher osmotic water flux. A polyamide selective membrane layer is built upon the smallest pores side (if the pores vary in size) via in-situ interfacial polymerization. We have demonstrated the capability of making both nanofiltration membranes (fabricated by interfacial polymerization of piperazine (PIP) based polyamide) and RO membranes (fabricated by coating m-phenylenediamine (MPD) based polyamide).

Diamine monomers piperazine (PIP) and m-phenylenediamine (MPD) were purchased from Acros Organic and Sigma-Aldrich, respectively. Acid chloride monomer trimesoyl chloride (TMC) and acid acceptor triethylamine (TEA) were purchased from Sigma-Aldrich. Hexane, the solvent for TMC, was purchased from Fisher Scientific. Deionized water (DI) obtained from a Milli-Q ultrapure water purification system (Millipore, Billerica, Mass.) was used as the solvent for diamine monomers. Sodium chloride and magnesium sulfate were purchased from Fisher Scientific.

Example 1

The procedure for demonstrating the fabrication of these TFC membrane structures by interfacial polymerization of PIP-based polyamide was as follows.

The monomers used for this in situ interfacial polymerization of poly(piperazinamide) were PIP and TMC. PIP was dissolved in Milli-Q water at varying concentrations ranged from 0.25% to 3% (w/v). Triethylamine (TEA) with the weight ratio of 1/1 with respect to the PIP amount was added to the PIP aqueous solution. A 0.15% (w/v) solution of trimesoyl chloride (TMC) in hexane was prepared. Both solutions were stirred at room temperature for a minimum of 3 hours prior to use.

The BLA010 nylon 6,6 microfiltration (MF) membrane/support layer was placed on a flat glass plate with large pores side facing the glass plate and all edges were sealed with tapes. The MF membrane was first immersed into an aqueous PIP/TEA solution for 2 minutes. The MF membrane was placed into the solution such that the backside of the plate was not immersed in the solution. After 2 minutes, the plate was lifted from the solution and the excess solution was allowed to drain from the surface. The plate was then placed on a rubber mat, with the glass down and the support facing up and a rubber roller was used to remove the excess solution from the support membrane. Then, the support membrane was dipped vertically into a TMC/hexane solution for one minute in a custom-fabricated 350-mL container to form a thin film poly(piperazineamide) film. The resulting composite film was air dried for 2 minutes and subsequently cured in an air-circulation oven at 80° C. for 5 minutes for attaining the desired stability of the formed structure. The as-prepared thin TFC poly(piperazineamide) membrane structure was thoroughly washed and stored in deionized water at 4° C. before carrying out evaluation studies.

The procedure for interfacial polymerization of MPD-based polyamide was similar to that of PIP-based polyamide except that the aqueous solution was pure MPD in water with varying concentrations ranged from 025% to 3% (w/v).

These processes are easily scaled up to larger scale fabrication since they are similar to existing methods of interfacial polymerization.

Example 2

Comparative

Commercial asymmetric cellulose triacetate (HTI-CTA) forward osmosis (FO) membrane (Hydration Technology Innovations Inc., Albany, Oreg.), TFC nanofiltration membrane NF270 and TFC seawater RO membrane SW30-XLE (Dow Water & Process Solutions Company, Midland, Mich.) were acquired for comparison. These membranes have three layers: a polyamide selective thin film layer, a microporous polysulfone (PSu) interlayer layer, and a high-strength polyester support web.

Example 3A

Experimental Methodology

Surface morphology of the BLA010 MF support and the TFC polyamide membranes were qualitatively evaluated with scanning electron microscopy (SEM) using a cold cathode field emission scanning electron microscope JSM-6335F (FEI Company, USA). Before imaging, samples were kept overnight in a desiccator and then sputter coated with a thin layer of platinum to obtain better contrast and to avoid charge accumulation.

Surface morphology of the BLA010 MF support and the TFC polyamide membranes were qualitatively evaluated with scanning electron microscopy (SEM) using a cold cathode field emission scanning electron microscope JSM-6335F (FEI Company, USA). Before imaging, samples were kept overnight in a desiccator and then sputter coated with a thin layer of platinum to obtain better contrast and to avoid charge accumulation.

Cross-sectional structure of the BLA010 support and the selective layers of TFC membranes were also imaged with SEM. These samples were prepared for imaging using a freeze fracture technique involving liquid nitrogen. Due to the difficulty to freeze fracture the reinforced nonwoven scrim, a razor blade was also submerged into liquid nitrogen with the sample strip simultaneously and then used to quickly cut the sample into half once removed from the liquid nitrogen. The prepared samples were sputter coated with a thin layer of gold before imaging.

The thickness of the support was measured using a digital micrometer at 5 different locations for each membrane sample. A CAM 101 series contact angle goniometer was used to measure the contact angle of the support.

Pure water permeability (A) for poly(piperazinamide) TFC membranes made at different PIP concentrations were evaluated by using DI as a feed. Pure water permeability tests were conducted at four pressures ranging from 50 to 250 psi, at a cross-flow velocity of 0.26 m/s at 25° C. The salt rejection evaluation for poly(piperazinamide) TFC membranes was conducted in a similar way except 2000 ppm $MgSO_4$ instead of DI water was used as the feed. Observed salt rejection rate (% R) was characterized by measuring the conductivity of the bulk permeate and the feed.

Pure water permeability and salt rejection tests for polyamide TFC membranes were carried out using DI and 2000 ppm NaCl as the feed at four pressures ranging from 150 to 300 psi, respectively. The SW30-XLE was used as a control. Other testing conditions are kept the same as that for poly(piperazinamide).

The pure water permeability and salt rejection rate of our optimum polyamide TFC membranes was also compared with commercial FO membranes at 20° C., at which the osmotic flux tests were conducted. The solute permeability coefficient, B, was also determined to calculate structural parameter, S.

Pure water permeability, A, was determined by dividing the pure water flux ($J_w$) by the applied pressure ($\Delta P$), $A=J_w/\Delta P$. Salt rejection rate, % R, was determined from the difference in bulk feed (cf) and permeate (cp) salt concentrations measured using a conductivity meter.

The solute permeability coefficient, B, was determined from:

$$B = J_w\left(\frac{1-R}{R}\right)\exp\left(-\frac{J_w}{k}\right) \quad (1)$$

where k, the cross-flow cell mass transfer coefficient, is calculated from correlations for this geometry.

Osmotic water flux and reverse salt flux of polyamide TFC membranes were evaluated using a custom lab-scale cross-flow forward osmosis system. A 1.5 M sodium chloride solution was used as the draw solution while DI water was used as the feed solution. Osmotic flux tests were carried out with the membrane oriented in both PRO mode (the membrane active layer faces the draw solution) and FO mode (the membrane active layer faces the feed solution). The hydraulic pressures of the feed and draw solutions were the same (1.5 psi) and the cross-flow velocities were kept at 0.18 m/s for both the feed and draw solutions. The temperatures of the feed and draw solutions were maintained at 20±1° C. using a recirculation water bath and a heat exchanger. Conductivity of the feed was measured to estimate the reverse salt flux through the membrane.

The osmotic water flux, $J_w$, was calculated by dividing the volumetric flux by the membrane area. By measuring the conductivity of the feed solutions at certain time points during the tests, the reverse salt flux, $J_s$, was calculated by dividing the NaCl mass flow rate by the membrane area.

The specific salt flux, $J_s/J_w$, was determined as the ratio of the reverse salt flux and the water flux. The structural parameter was determined by using equation $$S = \left(\frac{D}{J_w}\right)\left(\ln\frac{B + A\pi_{D,b}}{B + J_w + A\pi_{F,m}}\right) \quad (2)$$

where D is the diffusion coefficient of the draw solute, $J_w$ is the measured water flux, B is the solute permeability, A is the pure water permeability, $\pi_{D,b}$ is the bulk osmotic pressure of the draw solution, and $\pi_{F,m}$ is the osmotic pressure at the membrane surface on the feed side (0 atm for DI feed).

Example 3B

Experimental Results

Figure 11A:
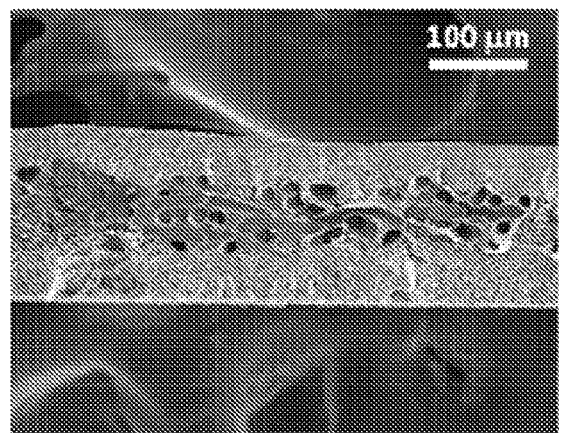
FIG. 11 provides scanning electron microscope (SEM) images of a nylon 6,6 microfiltration support (BLA010): (a) cross-section, (b) surface of small-pore region on which the thin film selective layers were formed (magnification 5,000×), and (c) surface of large-pore region (magnification 5,000×)
Figure 11B:
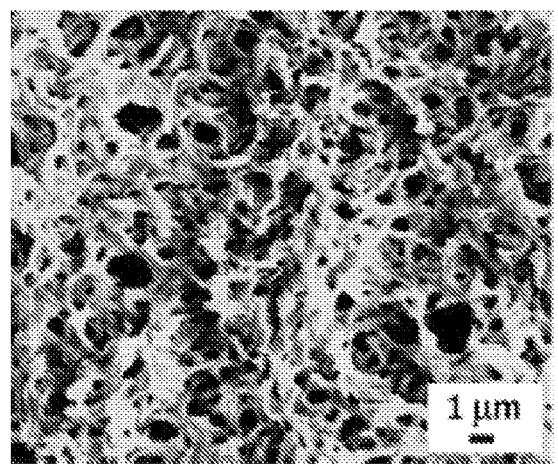
Figure 11C:
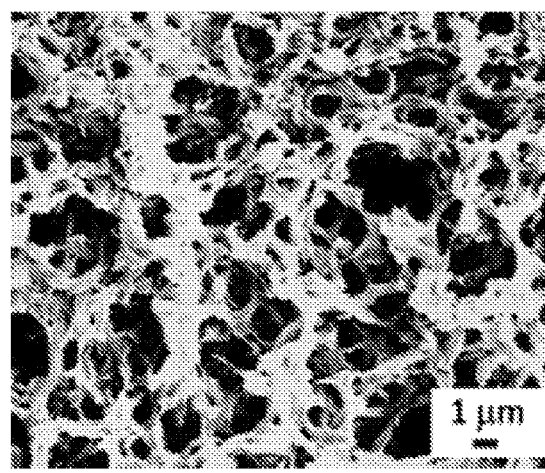
Figure 12A:
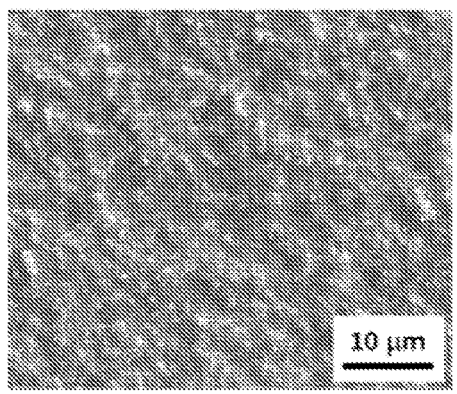
FIG. 12 provides top surface SEM images (magnification 2,200×) of poly(piperazinamide) of TFC membranes made at PIP concentrations of (a) 0.25% (w/v); (b) 0.5%; (c) 1.0%; (d) 2.0%; and (e) 3.0% and of (f) comparative/commercial NF270.
Figure 12B:
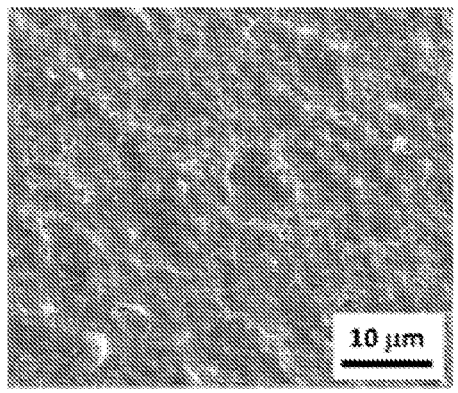
Figure 12C:
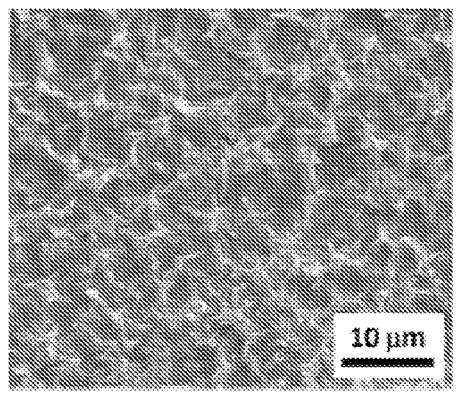
Figure 12D:
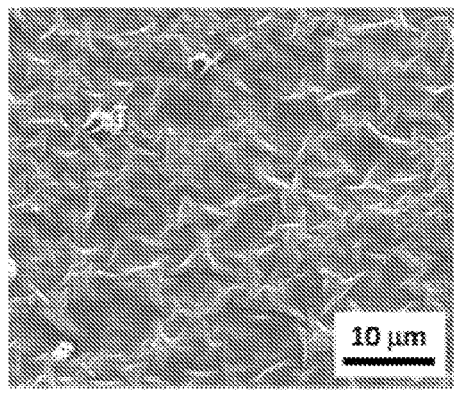
Figure 12E:
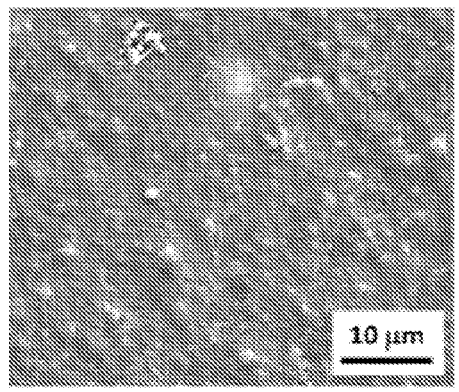
Figure 12F:
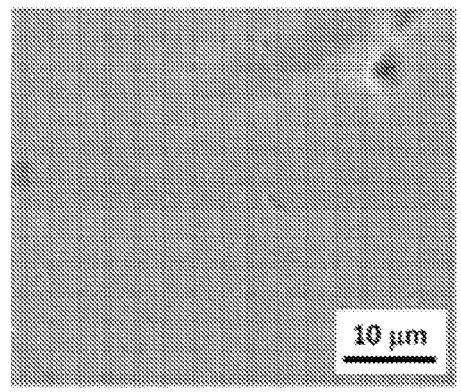
Figure 13A:
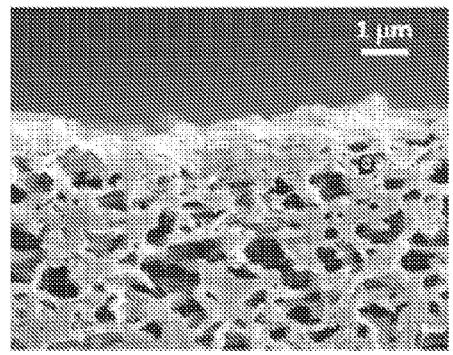
FIG. 13 provides cross-sectional SEM images of poly (piperazinamide) of TFC membranes made of (a) 0.25% (w/v); (b) 0.5%; (c) 1.0%; (d) 2.0%; and (e) 3.0%.
Figure 13B:
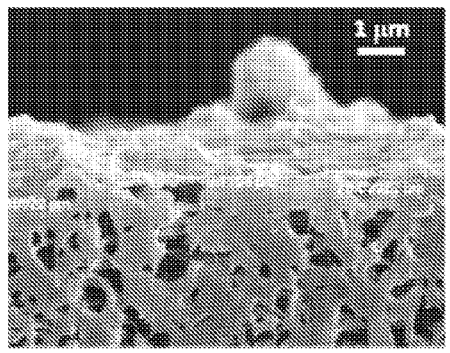
Figure 13C:
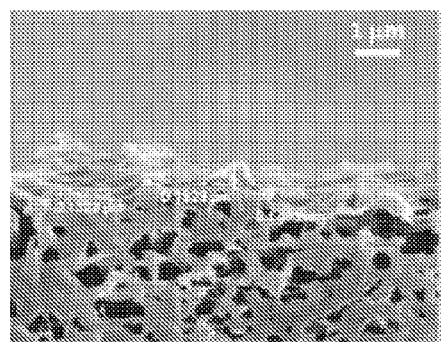
Figure 13D:
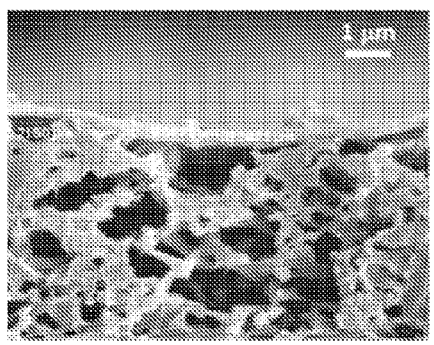
Figure 13E:
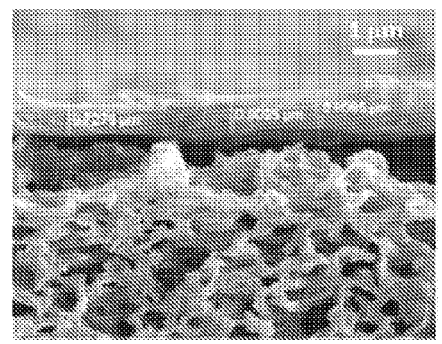

The surface and cross-sectional SEM images of a nylon 6,6 MF support (BLA010) are shown in FIG. 11. Both the surface of small-pore region and large-pore region show rough and open porous morphology. The surface porosities of two zones are 51.1% and 48.4%, respectively. The average thickness of the support was measured to be 181.4±1.1 μm and the contact angle of the support is approximately 40.5 degrees, which is 40 to 50 degree lower than that of conventional TFC PSu supports.

While these membranes are typically oriented with the larger pores facing the feed during MF, the selective layers of the TFC membranes are built on the small pore size. The small pores region allows for an integral selective layer to form with fewer defects while the large pores zone decreases the resistance to mass transfer.

The top surface SEM images for poly(piperazinamide) selective layers made at different PIP concentrations are shown in FIG. 12. Defect free films were obtained for TFC membranes made at all PIP concentrations ranging from 0.25 to 3%. The surface morphology varied with PIP concentration. "Circle-like" morphologies can be observed on 0.25% and 0.5% PIP-based TFC membranes, while a more uniform peak-and-valley structure appeared when using 1.0% and 2.0% PIP. These peaks and valleys may be caused from the rough support layer as the lower PIP concentrations yield thinner films. For 3.0% PIP-based membrane, it seems that the selective layer entirely covered the features of the support and peak-and-valley structure disappeared. Generally, the PIP-based TFC membranes gave rougher surfaces than commercial NF270.

The cross-sectional SEM images for poly(piperazinamide) selective layers made at different PIP concentrations are shown in FIG. 13. The corresponding thickness as a function of PIP concentration is shown in Table 1.

TABLE 1

| Membrane | Average thickness of the selective layer (μm) |
| --- | --- |
| 0.25% PIP | 0.08 |
| 0.5% | 0.10 |
| 1.0% | 0.13 |
| 2.0% | 0.30 |
| 3.0% | 0.85 |

Ultra-thin poly(piperazinamide) layers with the thickness less than 1 micron were obtained. The thickness of the selective layers first gradually increased with increasing PIP concentration up to 2%, and then dramatically increased to 0.9 micron at 3% PIP. It is also important to note that at 3% PIP, the poly(piperazinamide) selective layer seems to delaminate from the support. On the other hand, the resulting TFC selective layers made at lower PIP concentration (i.e., less than 1%) were better integrated with the support, indicating better adhesion with the support.

Figure 14:
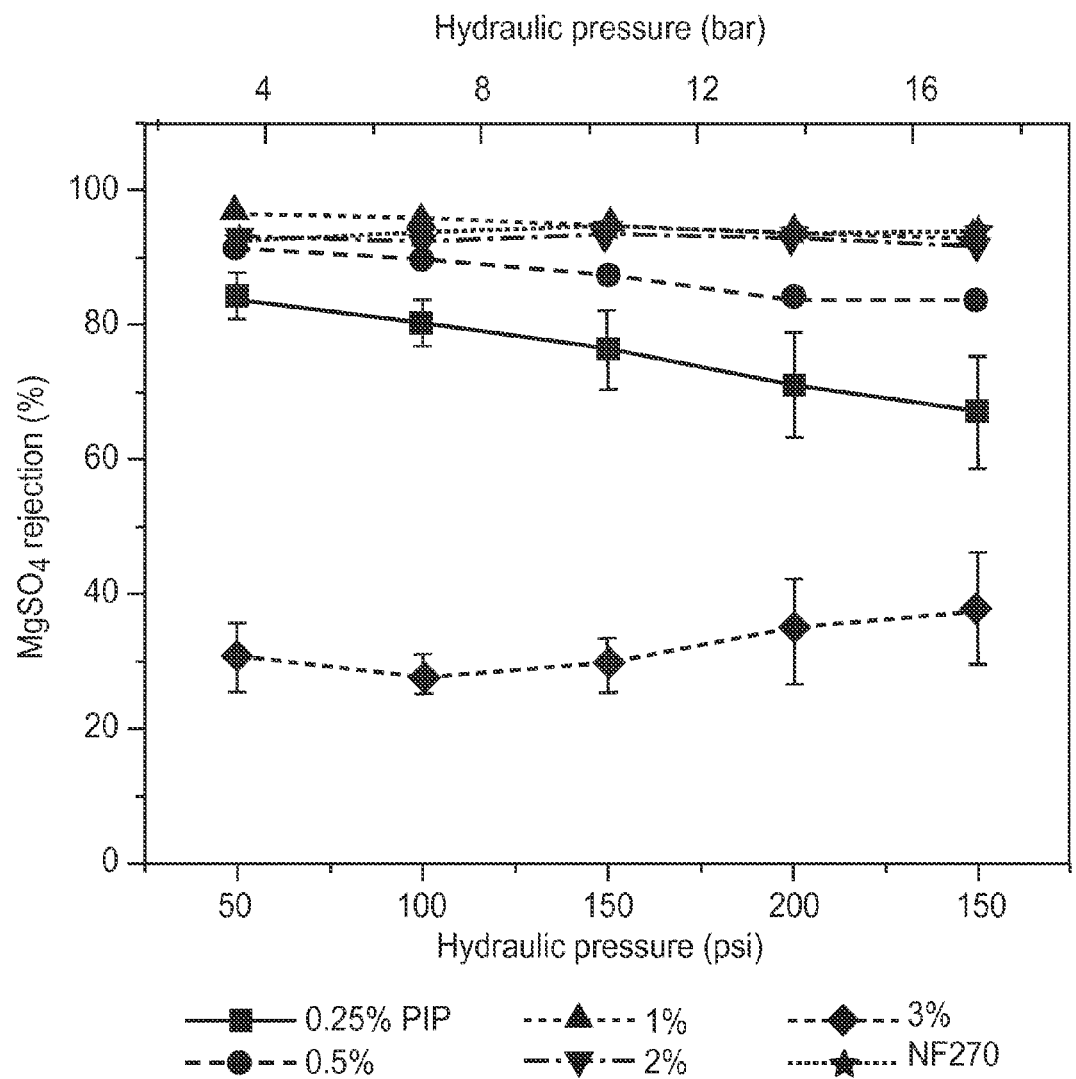
FIG. 14 is a graph of $MgSO_4$ rejection of TFC membranes fabricated from different PIP concentrations. Tests were conducted over a range of hydraulic pressures in revise osmosis. Experimental Conditions: 2000 ppm NaCl as the feed; cross-flow velocity of 0.26 m/s; 25° C.
Figure 15A:
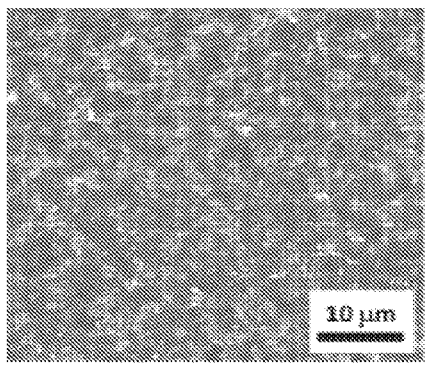
FIG. 15 provides top surface SEM images (magnification 2,200×) of polyamide of TFC membranes made at MPD concentrations of (a) 0.25% W/V); (b) 0.5%; (c) 1.0%; (d) 2.0%; and (e) 3.0%; and of (f) commercial SW-30XLE.
Figure 15B:
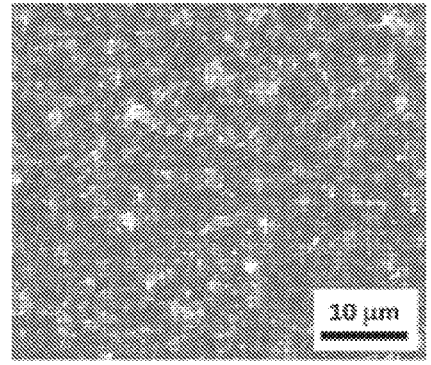
Figure 15C:
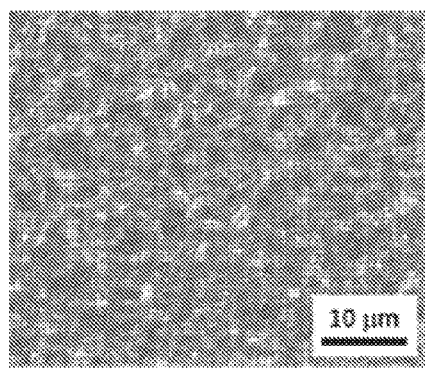
Figure 15D:
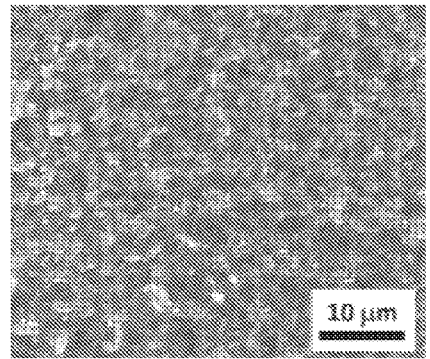
Figure 15E:
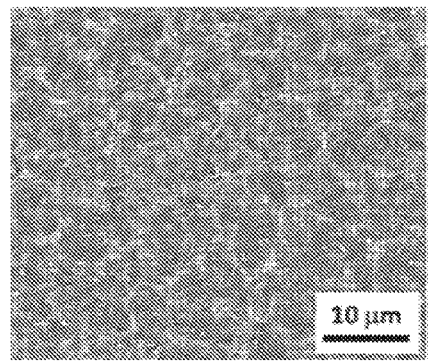
Figure 15F:
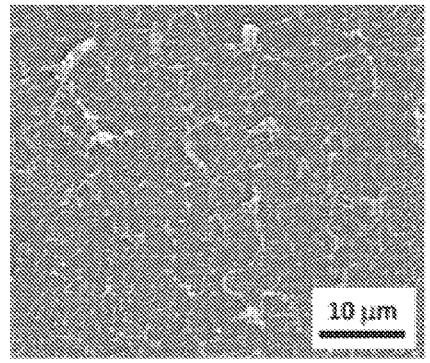
Figure 16A:
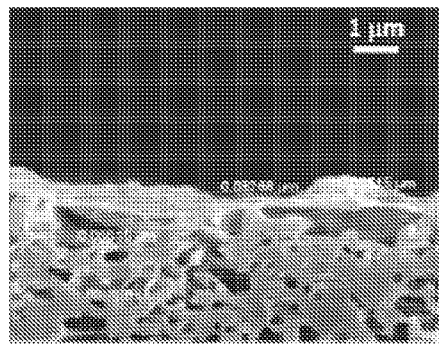
FIG. 16 provides cross-sectional SEM images of polyamide of TFC membranes made at MPD concentrations of (a) 0.25% (w/v); (b) 0.5%; (c) 1.0%; (d) 2.0%; and (e) 3.0%.
Figure 16B:
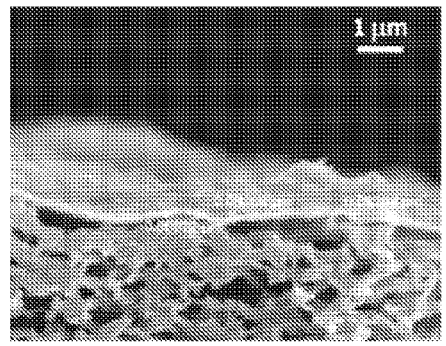
Figure 16C:
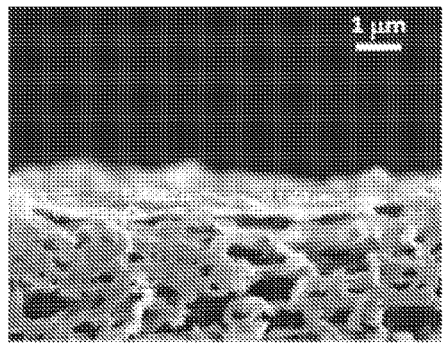
Figure 16D:
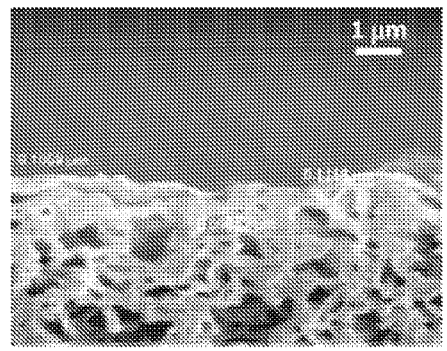
Figure 16E:
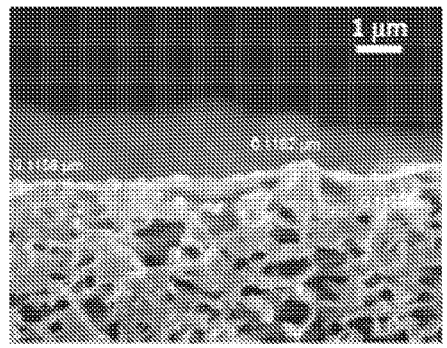

FIG. 14 illustrates the $MgSO_4$ rejection rates for PIP-based TFC membranes as a function of PIP concentration. The rejection rate increased with an increase in PIP concentration until 2% due to increased density of the film, then unexpectedly dropped at 3%. This dramatic performance drop for 3% PIP selective layer may be due to the observed delamination of the selective layer in the SEM images (FIG. 13). It is also seen that the rejection for 0.25% and 0.5% PIP-based membranes decreased with increasing hydraulic pressure, indicating the resulting films became more flexible and/or weaker under higher pressures. However, the rejection rates of 1% and 2% PIP-based TFC membranes maintained above 95% over a range of hydraulic pressures, which approached the rejection performance of NF270. The good pressure tolerance of the TFC membranes also implies their potential application in pressure retarded osmosis.

Table 2 shows the pure water permeability of the PIP-based TFC membranes. The water permeability decreased with enhancing PIP concentration due to the increased thickness of the selective layer. Comparing with commercial NF270, the 1% PIP-based TFC membrane not only showed a similar rejection rate, but also a matched water flux. Overall performance of the TFC membranes matched up with that of an industry standard commercial NF membrane.

TABLE 2

| Membrane | Pure water permeability (LMH/bar) |
| --- | --- |
| 0.25% PIP | 11.6 |
| 0.5% | 10.4 |

TABLE 2-continued

| Membrane | Pure water permeability (LMH/bar) |
|---|---|
| 1.0% | 9.4 |
| 2.0% | 8.0 |
| 3.0% | 3.1 |
| NF270 | 10.6 |

The top surface SEM images for polyamide selective layers made at different MPD concentrations are shown in FIG. 15. Defect free films with ridge-and-valley structure were obtained for TFC membranes made at all MPD concentrations ranging from 0.25 to 3%. All of the selective layers of the TFC membranes appeared to be rougher than commercial SW30-XLE membranes.

The cross-sectional SEM images for polyamide selective layers made at different MPD concentrations are shown in FIG. 16. The corresponding measured thickness of the polyamide layers as a function of MPD concentration is shown in Table 3.

TABLE 3

| Membrane | Average thickness of the selective layer (μm) |
|---|---|
| 0.25% MPD | 0.07 |
| 0.5% | 0.08 |
| 1.0% | 0.10 |
| 2.0% | 0.11 |
| 3.0% | 0.12 |

The thickness slightly increased with increasing MPD concentration (approximately 50 nm over the range of MPD concentrations). This is a different result than the poly(piperazinamide) which exhibited a stronger thickness dependence on monomer concentration. It is due to differences in the diffusivities and the reacting kinetics with TMC of the two amines. The interfacial polymerization is described to take place in three steps: incipient film formation, a fast process followed by slowing down in polymerization depending upon the permeability of the initial film formed; finally shifting to a diffusion controlled process. The initial layer formed during the incipient film formation is the actual barrier layer. Then film growth takes place until diffusion of monomers starts to be limited. The termination of the reaction is explained by slower diffusion of diamines as well as by hydrolysis of the acid chlorides that competes with the polymerization. For MPD-based polyamide, it is possible that at the low concentration of MPD (≤0.5%), increase in MPD concentration up to 0.5% leads to the formation of barrier layer with maximum thickness corresponding to 0.15% TMC concentration. Further increase in MPD concentration can lead to some accumulation of MPD in the amino end group rich region of the thin film. This could increase the density of the thin film since the film thickness remains almost unchanged at this stage. However, PIP reacts with TMC much slower than MPD, so it would take longer time to form a relatively thick barrier layer under higher PIP concentration. Furthermore, the addition of acid acceptor consumes most of the acid chlorides formed during reaction, which might postpone the completion of polymerization.

Figure 17:
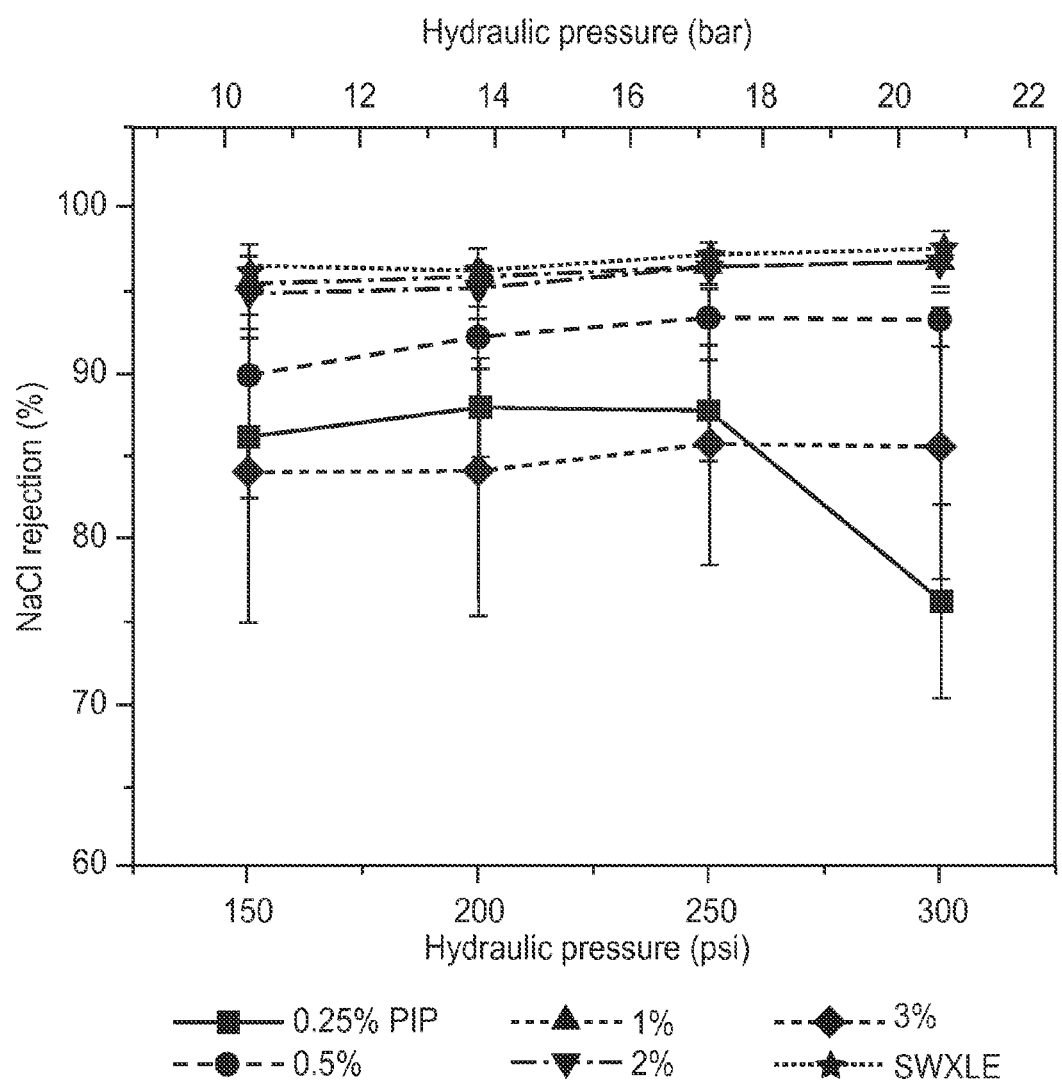
FIG. 17 is a graph of NaCl rejection of TFC membranes fabricated from different MPD concentrations. Tests were conducted over a range of hydraulic pressures in reverse osmosis. Experimental conditions: 2000 ppm NaCl as the feed; cross-flow velocity of 0.26 m/s; 25° C.

The NaCl rejection rates for MPD-based TFC membranes as a function of MPD concentration are shown in FIG. 17. The rejection rate of 0.25% MPD-based TFC membrane dramatically dropped at 300 psi due to the low mechanical strength of the thin selective layer. Similar to PIP-based TFC membranes, salt rejection of these membranes increased with MPD concentration (up to 2% MPD). It was due to the enhancement of crosslinking density which leaded to the formation of denser polyamide layers. Also, the chain flexibility of the polyamide may decrease with increasing concentration of MPD. The rejection rate at 3% MPD may have dropped due to a reduced water flux which reduces dilution of the salt flux. As "dilution effect" implies, high permeate flux dilutes the salt crossing the membrane, which in turns increases the salt rejection rate. In comparison with commercial SW30-XLE, the 1% and 2% MPD-based TFC membranes showed matched rejection rates, which maintained above 95%. It is important to note that they can also tolerate hydraulic pressure of at least 300 psi without compromising the rejection performance, meaning they might be suitable for pressure retarded osmosis.

Table 4 also compares the pure water permeability of MPD-based TFC membranes with commercial SW30-XLE. Similar to PIP-based TFC membranes, increasing MPD concentration caused a water flux decline due to the increased crosslinking density and decreased chain flexibility of the polyamide film. In comparison with commercial SW30-XLE, 1% MPD seemed to be the optimal concentration because the resulting TFC membrane not only showed an excellent rejection rate, but also a relatively high water flux, which approached the performance of a commercial sea water RO membrane.

TABLE 4

| Membrane | Pure water permeability (LMH/bar) |
|---|---|
| 0.25% MPD | 1.96 |
| 0.5% | 1.21 |
| 1.0% | 0.94 |
| 2.0% | 0.76 |
| 3.0% | 0.64 |
| SW30-XLE | 1.08 |

Cross-flow reverse osmosis tests revealed that 1% PIP- and 1% MPD-based TFC membranes approached the performance of commercial NF270 and SW30-XLE, respectively and hence were considered as optimum samples. Osmotic flux tests using 1.5 M NaCl as the draw solution were conducted on 1% MPD-based TFC membranes (referred to TFC-EO) and commercial HTI-CTA membrane (referred to HTI) was used as the control.

Figure 18A:
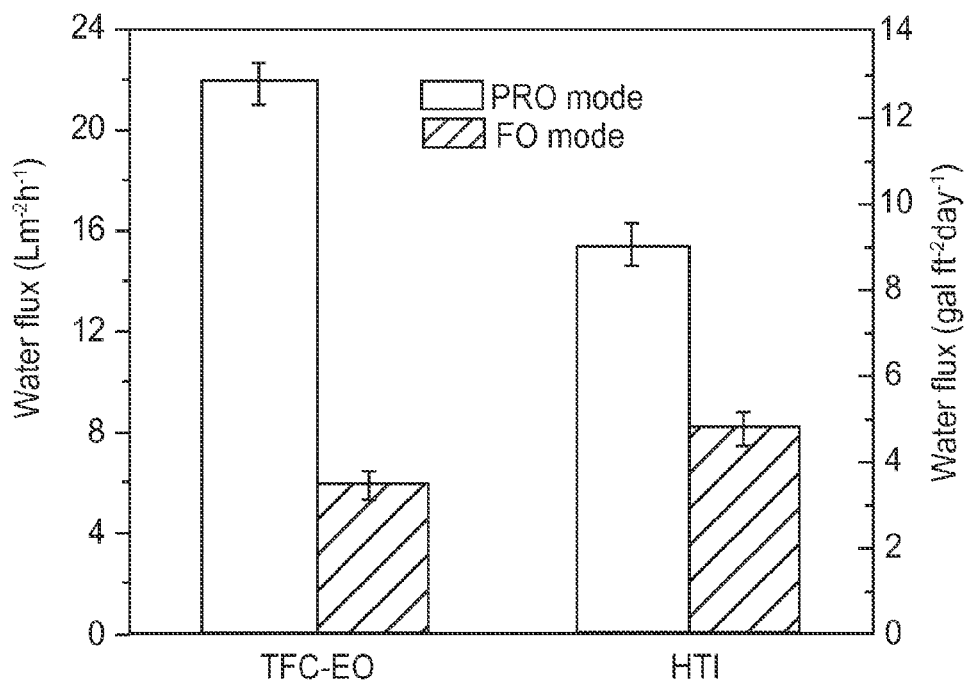
FIGS. 18A and 18B are graphs of comparison of (a) osmotic water flux and (b) reverse salt flux between TFC-EO and HTI membranes in both PRO and FO modes. Experimental conditions: 1.5 M NaCl as the draw solution; DI water as the feed; cross-flow velocity of 0.18 m/s; 20° C.

FIG. 18A presents the osmotic water flux performance of both TFC-EO and commercial FO membranes. It can be seen that the TFC-EO membrane yielded higher water flux than HTI in the PRO mode. This is primarily due to the higher permselectivity of the TFC membranes. As can be seen from Table 5, the TFC-EO membrane exhibits a higher water permeability coefficient and lower solute permeability than the HTI FO membrane.

TABLE 5

| | | TFC-EO | HTI |
|---|---|---|---|
| | % R[a] | 95.8 | 85.4 |
| | A (LMH/bar) | 0.917 | 0.599 |
| | B (LMH) | 0.300 | 0.942 |
| $J_s/J_w$ (g/L) | PRO mode | 0.036 | 1.025 |
| | FO mode | 0.111 | 0.908 |
| | S (μm) | 1940 | 966 |

[a]These parameters were measured in cross-flow reverse osmosis. Experimental conditions: 2000 ppm NaCl feed solution, 150 psi applied pressure, cross-flow velocity of 0.26 g/s, and temperature 20° C.

Figure 18B:
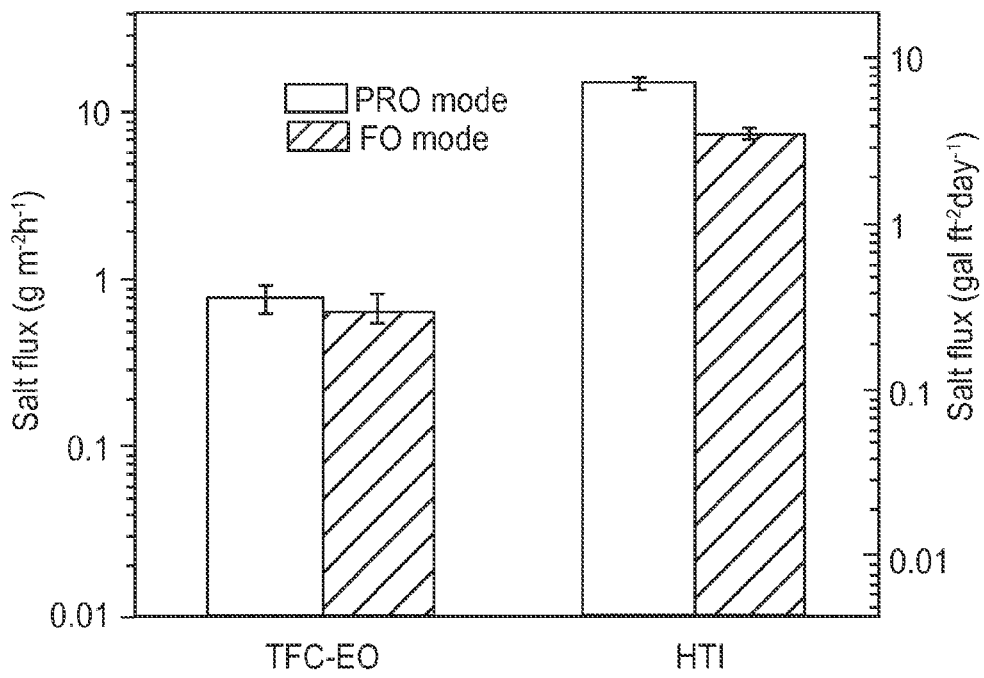

This observation is expected because TFC membranes generally have higher permselectivity than asymmetric membranes due to their ultra-thin, dense, and crosslinked structure of polyamide. The lower solute permeability reduces salt crossover from the draw solution that induces internal concentration polarization (ICP). In PRO mode with DI as the feed, only solute crossing over the selective layer can induce ICP and hence the flux performance is largely dependent on the rejecting ability of the membrane. In FO mode, both TFC-EO and commercial HTI membranes showed lower water flux than that in PRO mode due to the more severe ICP that occurred when the support was facing the draw solution. What's more, in FO mode, the TFC-EO membrane showed slightly lower water flux than the HTI membrane primarily due to the thickness of the 3M membranes used as supports (180 μm compared to approximately 50 μm). Thicker supports enhance ICP and are generally not desired in FO membranes. Interestingly, the nylon 6,6 supports exceed the HTI membrane support thickness by a factor of three yet water flux performance is nearly equal. The reverse salt flux performance for both TFC-EO and HTI membranes are presented in FIG. 18B. In both PRO and FO mode, the TFC membranes showed approximately 10 times lower reverse salt flux than HTI which is primarily due to the higher selectivity of TFC membranes than integrated asymmetric membranes. The reverse salt passage for both membranes in FO mode was slightly lower than those in PRO mode. This is primarily due to the higher salt concentration difference, and hence effective driving force, at the selective layer interface in PRO mode than that in FO mode. Overall, in all tests the membrane exhibited consistent performance and showed no performance change due to the presence of high concentrations of salt. No delamination of the selective layer was observed during the tests.

It is worth mentioning that this new TFC-EO membrane yielded approximately 20 fold higher water flux with the same order of magnitude of salt flux compared to commercial TFC-RO membranes (SW30-XLE) reported in other studies under similar experimental conditions in PRO mode. Since the TFC-EO membrane showed similar rejection rate and pure water permeability to SW30-XLE, the dramatic improvement in water flux must be attributed by the reduced ICP within the support. Without intending to be bound by theory, it is thought that the reduced ICP for this nylon 6,6 support is more due to its hydrophilicity than its structure. The PSu support for Dow FilmTec RO membranes generally has a comparable thickness (~150 μm) and porosity (approximately 50%) to nylon 6,6 support (~180 μm and approximately 50~60% porosity). Improved wetting of this layer will dramatically reduce the effective structural parameter and improve osmotic flux. Furthermore, also without intending to be bound by theory, it is thought that the higher surface porosity of the 3M support at the interface with the selective layer improves the water flux because the selective layer is not shadowed by the selective layer. The more of the selective layer not blocked by the support facilitates the transport of both water and salts away from the interface. The surface porosity of this support was measured to be approximately 50%, while that of commercial RO membrane is reported to be less than 20%.

Table 5 also summarizes the comparison of the specific salt flux and structural parameter between the TFC membranes and HTI membrane. Specific salt flux represents the amount of draw solute loss per liter of water produced. The specific salt flux should be as low as possible in order to reduce the loss of draw solute. It can be seen from the table that the TFC-EO membrane exhibited 28 times lower specific salt flux in PRO mode and 8 times lower in FO mode when compared to the HTI membrane. These results indicate the TFC-EO membrane would save draw solution in FO and exhibit reduced ICP in PRO.

As is common with new FO membrane characterization, the structural parameter, S, can be calculated from osmotic flux tests. The structural parameter implies how severe the ICP effect is and it should also be as low as possible to maximize the water flux. Table 5 shows that the TFC-EO membrane has two times higher structural parameter of the commercial HTI membrane. This is attributed largely to the thicker support in the TFC membranes. This result was interesting given that the water flux through the membranes matched or exceeded the HTI membrane. This is further evidence that both the support layer properties and the selectivity substantially impact osmotic water flux performance.

In conclusion, for the first time, hydrophilic nylon 6,6 supported TFC membranes were successfully fabricated via in-situ interfacial polymerization. 1% PIP-based TFC membranes showed matched performance with NF270 and 1% MPD-based TFC membranes showed matched performance with SW30-XLE in reverse osmosis. The osmotic flux tests demonstrated that the TFC-EO membranes had higher water flux than commercial HTI in PRO mode and matched water flux in FO mode. Furthermore, the TFC-EO membrane also showed 10× lower reverse salt flux and 8-28 specific salt flux in FO or PRO mode. This excellent performance was found even though the membrane has a two-fold higher structural parameter than the HTI membrane.

Example 4

In one or more prophetic embodiments, formation of a nanofiltration thin film layer can be formed in-situ on the thin film support zone of any of the embodiments provided in FIGS. 4, 5, 7, and 9. This formation is accomplished per the general method used to produce the new TFC membranes according to FIG. 1, where the support layer is nominally dry when the aqueous phase is introduced, per the "Dry" method in FIG. 1.

Aqueous phase solution: piperazine (PIP)/triethylamine (TEA)/$H_2$; TEA: acid acceptor (equivalent amount with PIP); concentration: 0.25-3% (w/v). Higher w/v will produce thicker nanofiltration layers.

Organic phase solution: trimesoyl chloride (TMC)/ hexane. Keep concentration constant nominally 0.15% (w/v).

Procedure:

1. Provide a multi-zone membrane support per one of FIGS. 4, 5, 7, and 9.

2. Saturate, (i.e. uniformly wet) the multi-zone membrane support with the aqueous phase solution, preferably by first exposing the aqueous phase to the membrane surface that carries the thin film support zone. Exposure preferably for sufficient time to allow imbibing of solution to an equilibrium condition, ensuring the exposed thin film support zone is uniformly wetted. It is expected that the zone 2 including scrim may also become wetted with the aqueous phase solution, such wetting will be partial or complete.

3. This exposure and saturation is followed by a removal of excess PIP/TEA solution.

4. Expose the uniformly wetted thin film support zone to the organic phase solution. This exposure is preferably limited to the multi-zone membrane surface that carries the thin film support zone, and not to the opposite surface. The time of exposure is dependent on the aqueous phase component concentrations, the wetted void volume of the membrane, and the desired final thickness of the nanofiltration layer.

5. Remove the membrane from organic phase exposure. The membrane exposure has provided sufficient TMC to react with the imbibed PIP/TEA, as required to complete the nanofiltration layer formation.

6. Provide an oven cure, partial drying and stabilization of the TFC membrane. A curing exposure in an 80° C. oven is sufficient to complete the layer formation, Curing time and final moisture content is determined experimentally, as in step 3 above.

7. Rinse/wash and wet storage. A rinsing and cleaning step is expected to be performed after the curing and before storage. Typically, a nanofiltration membrane is stored in a damp or wet state.

8. At this point, the membrane may be tested for performance and converted into devices as needed.

Example 5

In one or more prophetic embodiments, formation of a nanofiltration thin film layer can be formed in-situ on the thin film support zone of any of the embodiments provided in FIGS. 4, 5, 7, and 9. This formation is accomplished per the general method used to produce the new TFC membranes according to FIG. 1, where the support layer is wet when the aqueous phase is introduced, per the "Wet" method in FIG. 1.

Aqueous phase solution: piperazine (PIP)/triethylamine (TEA)/$H_2$; TEA: acid acceptor (equivalent amount with PIP); concentration: 0.25-3% (w/v). Higher w/v will produce thicker nanofiltration layers.

Organic phase solution: trimesoyl chloride (TMC)/hexane. Keep concentration constant nominally 0.15% (w/v).

Procedure:

1. Form a multi-zone membrane support per one of FIGS. 4, 5, 7, and 9, but do not dry. Immediately after formation and the rinsing/washing step, start with the steps to prepare the thin film membrane.

2. Exchange rinse/wash water in the multi-zone membrane support with the aqueous phase solution, preferably by first exposing the aqueous phase to the membrane surface that carries the thin film support zone. Exposure preferably for sufficient time to allow complete exchange of solution with the rinse/wash water.

3. Remove of excess PIP/TEA solution.

4. Expose the so-treated thin film support zone to the organic phase solution. This exposure is preferably limited to the multi-zone membrane surface that carries the thin film support zone, and not to the opposite surface. The time of exposure is dependent on the aqueous phase component concentrations, the wetted void volume of the membrane, and the desired final thickness of the nanofiltration layer.

5. Remove the membrane from organic phase exposure. The membrane exposure has provided sufficient TMC to react with the imbibed PIP/TEA, as required to complete the nanofiltration layer formation.

6. Provide an oven cure, partial drying and stabilization of the TFC membrane. A curing exposure in an 80° C. oven is sufficient to complete the layer formation, Curing time and final moisture content is determined experimentally, as in step 3 above.

7. Rinse/wash and wet storage. A rinsing and cleaning step is expected to be performed after the curing and before storage. Typically, a nanofiltration membrane is stored in a damp or wet state.

8. At this point, the membrane may be tested for performance and converted into devices as needed.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A thin film composite membrane structure comprising: a selective membrane layer for ion rejection attached to a hydrophilic support layer, the hydrophilic support layer comprising a multi-zone microfiltration membrane that is asymmetric comprising:
   a porous support material; and
   at least two microfiltration zones, where a first zone comprises a first membrane and a second zone that is attached to the first zone and that coats at least a portion of the depth of the porous support material;
   wherein the first zone comprises a pore size that is smaller than a pore size of the second zone; and the pore size of the second zone is greater than the pore size of the first zone by a factor in the range of 1.1 to 500.

2. The thin film composite membrane structure of claim 1, wherein the selective membrane layer comprises a polyamide membrane formed by interfacial polymerization on the hydrophilic support layer.

3. The thin film composite membrane structure of claim 2, wherein the polyamide comprises piperazine (PIP), m-phenylenediamine (MPD), or combinations thereof.

4. The thin film composite membrane structure of claim 1, wherein the first zone comprises a pore size in the range of 0.02 microns to 0.45 microns.

5. The thin film composite membrane structure of claim 1, wherein the first zone comprises a thickness of at least 2.0 microns.

6. The thin film composite membrane structure of claim 1, wherein the second zone comprises a pore size in the range of 0.65 microns to 10.0 microns.

7. The thin film composite membrane structure of claim 1, wherein the second zone is continuously joined to the first zone through molecular entanglement.

8. The thin film composite membrane structure of claim 1, wherein the first zone of the multi-zone microfiltration support layer is attached to the selective membrane layer.

9. The thin film composite membrane structure of claim 1, wherein the support layer comprises a polyamide.

10. The thin film composite membrane structure of claim 1, wherein the support layer comprises a modified membrane formed from a polyethersulfone, a polysulfone, a polyvinylidene difluoride (PVDF), ethylene chlorotrifluoroethylene (ECTFE), and/or polypropylene.

11. A thin film composite membrane structure comprising:
a selective membrane layer for ion rejection, the selective membrane layer comprising a polyamide; and
a multi-zone microfiltration hydrophilic support layer attached to the selective membrane, the multi-zone microfiltration support layer being asymmetric and comprising:
a porous support material comprising a nonwoven, woven, or extruded material selected from the group consisting of polypropylene, polyester, polyethylene, and combinations thereof; and
two microfiltration zones only, each comprising a polyamide, where a first zone comprises a first membrane and a second zone that is attached to the first zone and that coats at least a portion of the depth of the porous support material;
wherein the first zone comprises a pore size in the range of 0.02 microns to 0.45 microns and a thickness in the range of 2.0 microns to 10 microns, and the second zone comprises a pore size in the range of 0.65 microns to 10.0 microns.

12. The thin film composite membrane structure of claim 11, wherein the polyamide of the selective membrane layer comprises piperazine (PIP), m-phenylenediamine (MPD), or combinations thereof.

13. A method of making a thin film composite membrane structure, the method comprising:

forming a multi-zone microfiltration hydrophilic membrane that is asymmetric comprising a porous support material; and at least two microfiltration zones, where a first zone comprises a first membrane and a second zone that is attached to the first zone and that coats at least a portion of the depth of the porous support material; and
forming a selective membrane on the multi-zone microfiltration membrane to form the thin film composite membrane structure;
wherein the first zone comprises a pore size in the range of 0.02 microns to 0.45 microns and a thickness in the range of 2.0 microns to 10 microns, and the second zone comprises a pore size in the range of 0.65 microns to 10.0 microns.

14. The method of claim 13, wherein the selective membrane is formed on the multi-zone microfiltration membrane by interfacial polymerization.

15. A method of treating a liquid stream containing ions, the method comprising:
providing a thin film composite membrane structure comprising a selective membrane layer for ion rejection attached to a hydrophilic support layer, the hydrophilic support layer comprising a multi-zone microfiltration membrane that is asymmetric comprising:
a porous support material; and
at least two microfiltration zones, where a first zone comprises a first membrane and a second zone that is attached to the first zone and that coats at least a portion of the depth of the porous support material;
wherein the first zone comprises a pore size that is smaller than a pore size of the second zone; and the pore size of the second zone is greater than the pore size of the first zone by a factor in the range of 1.1 to 500; and
contacting the liquid stream with the thin film composite membrane structure.

16. The method of claim 15, wherein the thin film composite membrane structure is provided in a reverse osmosis system, a nanofiltration system, a direct osmotic concentration system, a forward osmosis system, or a pressure retarded osmosis system.

17. The thin film composite membrane structure of claim 1, wherein the multi-zone microfiltration membrane that is asymmetric consists of two zones.

18. The method of claim 13, wherein the multi-zone microfiltration membrane that is asymmetric consists of two zones.

* * * * *